(12) United States Patent
Yamashita et al.

(10) Patent No.: US 12,483,763 B2
(45) Date of Patent: Nov. 25, 2025

(54) INFORMATION PROCESSING APPARATUS, INFORMATION PROCESSING METHOD, AND PROGRAM

(71) Applicant: Sony Group Corporation, Tokyo (JP)

(72) Inventors: Yuya Yamashita, Kanagawa (JP); Kazumasa Tanaka, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/285,445

(22) PCT Filed: Feb. 8, 2022

(86) PCT No.: PCT/JP2022/004897
§ 371 (c)(1),
(2) Date: Oct. 3, 2023

(87) PCT Pub. No.: WO2022/230291
PCT Pub. Date: Nov. 3, 2022

(65) Prior Publication Data
US 2024/0196069 A1    Jun. 13, 2024

(30) Foreign Application Priority Data
Apr. 26, 2021  (JP) ................................. 2021-074249

(51) Int. Cl.
*H04N 21/8549*   (2011.01)
*G06V 20/40*   (2022.01)

(52) U.S. Cl.
CPC ......... *H04N 21/8549* (2013.01); *G06V 20/44* (2022.01)

(58) Field of Classification Search
CPC .......................... H04N 21/8549; G06V 20/44
See application file for complete search history.

(56) References Cited

U.S. PATENT DOCUMENTS

| | | | |
|---|---|---|---|
| 11,863,848 B1* | 1/2024 | Lythcott-Haims | .... G06F 3/0482 |
| 2013/0216203 A1* | 8/2013 | Nakazawa | ............... H04N 9/79 386/241 |
| 2016/0105708 A1* | 4/2016 | Packard | ........... H04N 21/23424 725/10 |
| 2021/0117689 A1 | 4/2021 | Yamada | |

FOREIGN PATENT DOCUMENTS

| | | |
|---|---|---|
| JP | 2017-107404 A | 6/2017 |
| JP | 6765558 B1 | 10/2020 |

OTHER PUBLICATIONS

Miyamori et al., Method of Automatically Extracting Metadata of TV Programs Using Its Live Chat on the Web, Information Processing Society of Japan Transactions on Databases, Dec. 15, 2005, pp. 59-71, vol. 46, No. SIG18 (TOD28).

(Continued)

*Primary Examiner* — Girumsew Wendmagegn
(74) *Attorney, Agent, or Firm* — Paratus Law Group, PLLC

(57) ABSTRACT

Provided is an information processing apparatus including a specification unit that specifies auxiliary information for generating a digest video on the basis of scene-related information regarding a scene occurring in an event.

18 Claims, 18 Drawing Sheets

(56) References Cited

OTHER PUBLICATIONS

Yamauchi et al., Characteristic scene extraction based on switching viewpoints for automatic digest video generation, The 6th Forum on Data Engineering and Information Management (The 12th Annual Meeting of the Database Society of Japan), Mar. 3, 2014, pp. 1-5 (see the Translation of ISR for concise relevance).
May 10, 2022, Translation of International Search Report issued for related PCT Application No. PCT/JP2022/004897.

* cited by examiner

FIG. 14

| | V1 | V2 | V3 | V4 |
|---|---|---|---|---|
| SCORE FOR SIZE OF SUBJECT | 0.02 | 0.85 | 0.1 | 0.92 |
| SCORE FOR ORIENTATION OF SUBJECT | 0.1 | 0.9 | 0.1 | 0.1 |

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2022/004897 (filed on Feb. 8, 2022) under 35 U.S.C. § 371, which claims priority to Japanese Patent Application No. 2021-074249 (filed on Apr. 26, 2021), which are all hereby incorporated by reference in their entirety.

TECHNICAL FIELD

The present technology relates to a technical field of an information processing apparatus, an information processing method, and a program for generating a digest video.

BACKGROUND ART

It is desired that video content is created on the basis of an interest or concern of a user who views the video content.

For example, PATENT DOCUMENT 1 below discloses a system that generates, from information posted on a social networking service (SNS), television content to include content with a high degree of interest of a viewer.

CITATION LIST

Patent Document

PATENT DOCUMENT 1: Japanese Patent Application Laid-Open No. 2017-107404

SUMMARY OF THE INVENTION

Problems to be Solved by the Invention

However, it is difficult to grasp, from information obtained from the SNS or the like, which specific scene the viewer has an interest/concern in, and there are cases where appropriate video content cannot be generated.

The present technology has been made in view of such a problem, and an object thereof is to provide video content reflecting an interest/concern of a viewer.

Solutions to Problems

An information processing apparatus according to the present technology includes a specification unit which specifies auxiliary information for generating a digest video on the basis of scene-related information regarding a scene occurring in an event.

The event is, for example, a gathering such as a sports game or a concert. Furthermore, the auxiliary information is, for example, information used to generate a digest video, and is information used to determine which portion of a video is cut out from a captured video. For example, in the case of a sports game, specifically, information such as a player name, a scene type, and a play type is used as the auxiliary information.

BRIEF DESCRIPTION OF DRAWINGS

FIG. 4 is a flowchart illustrating an example of processing executed by a posted-data extraction unit.

FIG. 8 is a flowchart illustrating an example of processing executed by the posted-data extraction unit.

FIG. 14 is an example illustrating an example of a score assigned to a video of the imaging device.

MODE FOR CARRYING OUT THE INVENTION

Figure 1:
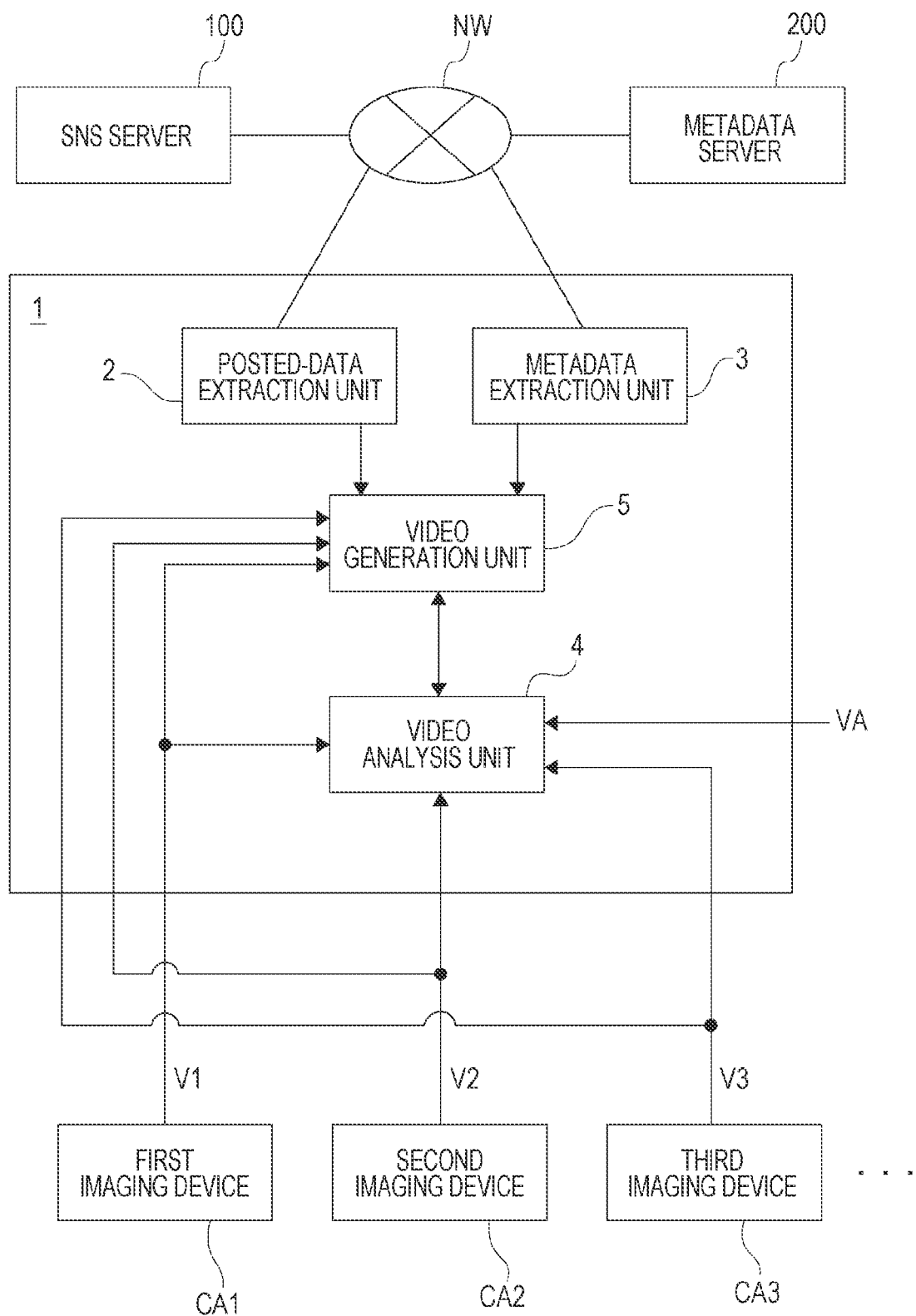
FIG. 1 is a diagram illustrating a system configuration example including an information processing apparatus.

Hereinafter, embodiments of an information processing apparatus according to the present technology will be described in the following order with reference to the accompanying drawings.

<1. System configuration>
<2. Processing flow>
<2-1. First processing flow>
<2-2. Second processing flow>
<2-3. Third processing flow>
<2-4. Flow of processing of generating clip collection>
<3. Scoring>
<3-1. Scoring method>
<3-2. Processing flow in video selection using scores>
<4. Modifications>
<5. Computer device>
<6. Summary>
<7. Present technology>

1. System Configuration

A system configuration example of the present embodiment will be described with reference to FIG. 1.

An information processing apparatus 1 of the present embodiment is an apparatus that generates a digest video DV regarding a gathering such as a sports game, a concert, or a stage. The generated digest video DV is distributed to a viewer.

Note that, in the following description, a sports game will be described as an example of the gathering. In particular, the information processing apparatus 1 that generates the digest video DV of an American football game will be described.

The digest video DV is a video in which important scenes for understanding the flow of the game are collected. Furthermore, the digest video DV can be read as a highlight video.

The information processing apparatus 1 includes a posted-data extraction unit 2, a metadata extraction unit 3, a video analysis unit 4, and a video generation unit 5.

The posted-data extraction unit 2 performs processing of extracting a keyword from a sentence, a hash tag, a video, or the like posted on a social networking service (SNS). Therefore, the information processing apparatus 1 is configured to be able to communicate with an SNS server 100 via a communication network NW.

The keyword extracted by the posted-data extraction unit 2 is, for example, a player name of a player who is participating in a game, a uniform number thereof, a name of a manager or a referee, or the like. These pieces of information are information that can identify a person. The player name includes not only a first name and a family name but also a nickname.

Furthermore, the keyword extracted by the posted-data extraction unit 2 may be information of a scene type indicating the content of play. Specifically, the information includes type information regarding a scoring scene such as Touch-down or a field goal, and type information regarding various fouls such as off-side or holding. Alternatively, information indicating a better play than usual or information indicating a failed play may be a type such as a superplay or a mistake.

The information extracted by the posted-data extraction unit 2 is information serving as an index for generating the digest video DV. In particular, the information posted on the SNS is information used for generating the digest video DV according to the interest/concern of the viewer.

The information extracted by the posted-data extraction unit 2 is information regarding a specific scene in an event, and is described as "scene-related information".

The metadata extraction unit 3 performs processing of extracting metadata including information indicating progress of a game or the like. The metadata may be, for example, information independently distributed by a company that operates a game, information input by a recording person (scorer) who records various types of information such as progress of a game while watching the game, or data distributed from a company that handles information regarding sports. Alternatively, the information may be information regarding the game progress uploaded on the web.

As an example of the metadata, the metadata is information in which scene type information, such as touch-down, a field goal, a foul, a change of a player, or an exit of a player, which occurs during a game, occurrence time of the scene, player information related to the scene, and information such as a change in a score accompanying the occurrence of the scene are associated.

The metadata may be distributed every time a specific scene occurs in the game, or may be collectively distributed after the end of the game.

The metadata extraction unit 3 is information regarding a specific scene in the event, and is also referred to as "scene-related information".

The information processing apparatus 1 is configured to be able to communicate with the metadata server 200 via the communication network NW so that the metadata extraction unit 3 can execute metadata extraction processing.

The video analysis unit 4 performs processing of receiving videos from the plurality of imaging devices CA arranged in the game venue, and performs image analysis processing on the received videos.

Furthermore, the video analysis unit 4 performs processing of acquiring a broadcast video VA which is the broadcast video, and performs image analysis processing on the broadcast video VA.

Note that although FIG. 1 illustrates a first imaging device CA1, a second imaging device CA2, and a third imaging device CA3 as an example of the imaging device CA, this is an example, and only one imaging device CA may be installed in the game venue, or four or more imaging devices CA may be installed in the game venue.

Furthermore, the video obtained from the first imaging device CA1 is referred to as a first video V1, the video obtained from the second imaging device CA2 is referred to as a second video V2, and the third video obtained from the third imaging device CA3 is referred to as V3.

The imaging devices CA are synchronized, and the images captured at the same timing can be recognized by referring to the time code.

The video analysis unit 4 obtains information of the subject imaged for each time by the image analysis processing. Examples of the information of the subject include the name of the subject such as a player name, uniform number information, an imaging angle, and the posture of the subject. Furthermore, the subject may be specified on the basis of a facial feature, a hairstyle, a hair color, an expression, or the like.

The video analysis unit 4 obtains information of a scene type that specifies a scene by the image analysis processing. The scene type information is, for example, information indicating whether the imaged scene is a scoring scene, a fouling scene, a scene of player change, or an injury scene. The scene type may be specified by the above-described posture detection of the subject. For example, the judge content of the referee may be estimated by detecting the posture of the referee and the scene type may be specified, or the scoring scene may be detected by detecting the gaze pose of the player.

The video analysis unit 4 specifies an in-point and an out-point by the image analysis processing. The in-point and the out-point are information for specifying a cutout range of the video captured by the imaging device CA. In the following description, a video of a predetermined range cut out by a set of an in-point and an out-point will be described as a "clip video CV".

For example, the in-point and the out-point may be determined by specifying the moment, at which the play of the detection target occurs, by the image analysis processing and using the specified moment as a base point.

Furthermore, in a case where the in-point and the out-point are detected on the basis of the broadcast video VA, the in-point and the out-point may be detected by detecting a video switching timing. That is, the video analysis unit 4 may specify the in-point and the out-point by performing the image analysis processing on the broadcast video VA and detecting the switching point of the imaging device CA.

The video analysis unit 4 assigns information obtained by the image analysis processing on a video. For example, the fact that a player A and a player B are imaged in a certain time zone in the first video V1 and the fact that the time zone has a touch-down scene are stored in association with each other.

Therefore, for example, in a case where it is desired to create the digest video DV by using a scene in which a specific player is imaged, it is possible to easily specify a time zone in which the specific player is imaged.

The video analysis unit 4 specifies the progress of the game by executing the image analysis processing on the broadcast video VA.

The broadcast video VA is generated by connecting specific partial videos (clip videos CV) by using the first video V1, the second video V2, and the third video V3 as materials and superimposing various types of information such as score information and player name information.

In the image analysis processing, by recognizing a subtitle, a three-dimensional image, and the like superimposed on a video, transition of scores, player change, a player name of a player captured in the image, an elapsed time in a game, and the like are specified.

Furthermore, the video analysis unit 4 may assign a score to every video by performing the image analysis processing. The score may be calculated as a likelihood in a case where the subject being imaged is specified, or may be calculated as an index indicating whether or not the video is appropriate as a video to be presented to the viewer.

Note that, although FIG. 1 illustrates a configuration in which the video analysis unit 4 acquires a video from the imaging device CA, the video analysis unit 4 may acquire a video from a storage device in which the video captured by the imaging device CA is stored.

The video generation unit 5 performs processing of generating the digest video DV by using the first video V1, the second video V2, and the third video V3.

Figure 2:
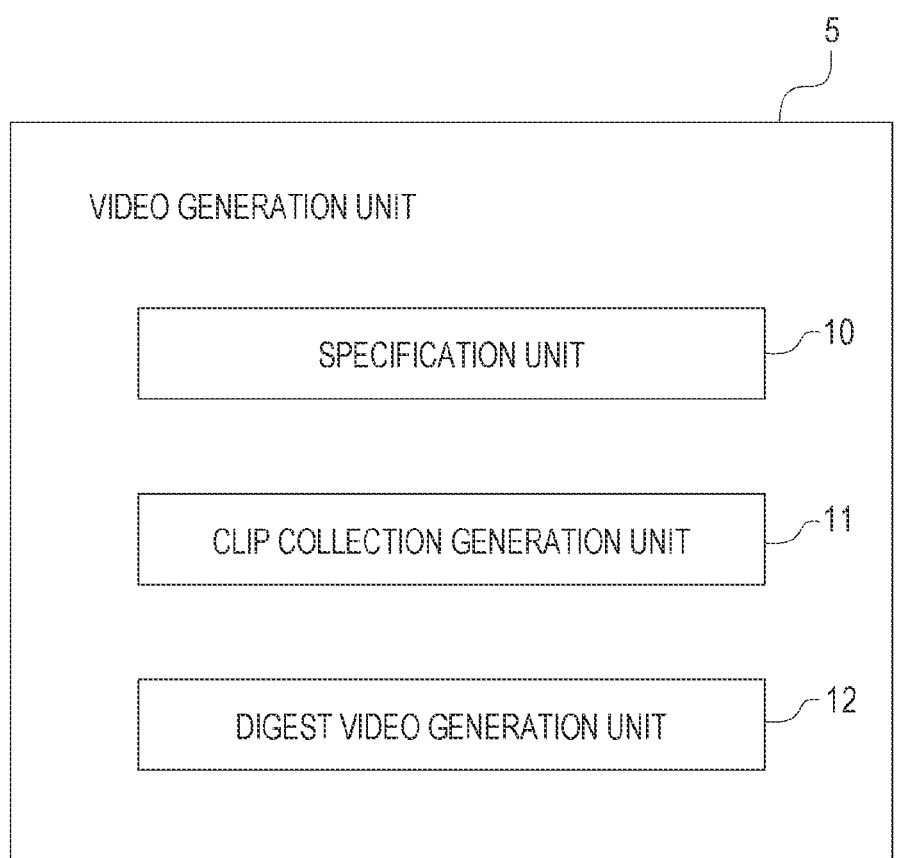
FIG. 2 is a diagram illustrating a functional configuration of a video generation unit.

For this purpose, the video generation unit 5 includes a specification unit 10, a clip collection generation unit 11, and a digest video generation unit 12 (see FIG. 2).

The specification unit 10 performs processing of specifying the auxiliary information SD for generating the digest video DV. Here, an example of a flow of generation of the digest video DV will be described.

It is assumed that a scoring scene occurs in a certain sports game. In this case, a clip collection CS for the scoring scene is generated. The clip collection CS is obtained by combining a plurality of clip videos CV, and for example, the clip video CV obtained by cutting out a time zone in which the scoring scene is imaged from the first video V1 imaged by the first imaging device CA1, the clip video CV obtained by cutting out a time zone in which the scoring scene is imaged from the second video V2 imaged by the second imaging device CA2, and the clip video CV obtained by cutting out a time zone in which the scoring scene is imaged from the third video V3 imaged by the third imaging device CA3 are combined to generate the clip collection CS for the scoring scene.

Such a clip collection CS is generated, for example, by the number of scoring scenes, the number of fouling scenes, or the number of scenes of player change.

The digest video DV is generated by selecting and combining the clip collection CS to be presented to the viewer from the plurality of clip collections CS generated in this manner.

For example, the auxiliary information SD is used to select the clip video CV to be included in the clip collection CS. The auxiliary information SD is a keyword used when the clip collection CS included in the digest video DV is selected from the plurality of clip collections CS. In a case where the name of a certain player is frequently posted on the SNS, it can be determined that the concern of the viewer in the player is high. In that case, a scoring scene, a fouling scene, or the like related to the player is selected and incorporated into the digest video DV.

Note that not only the player name and the nickname described above but also information that can identify the player may be used, and for example, keywords such as a position name and a referee may be used.

Alternatively, the auxiliary information SD may be a keyword as the scene type information. For example, in a case where there are many posts regarding a fouling scene on the SNS, it can be determined that the concern of the viewer in the fouling scene is high. In that case, the clip collection CS of the fouling scene is selected and incorporated into the digest video DV.

Note that the auxiliary information SD may be type information such as a scoring scene or a fouling scene, or may be a keyword indicating type information, such as a field goal scene, a touch-down scene, or a specific foul name, which is finer than the above.

Furthermore, the auxiliary information SD may indicate a combination order of the clip videos CV included in the clip collection CS.

Figure 3:
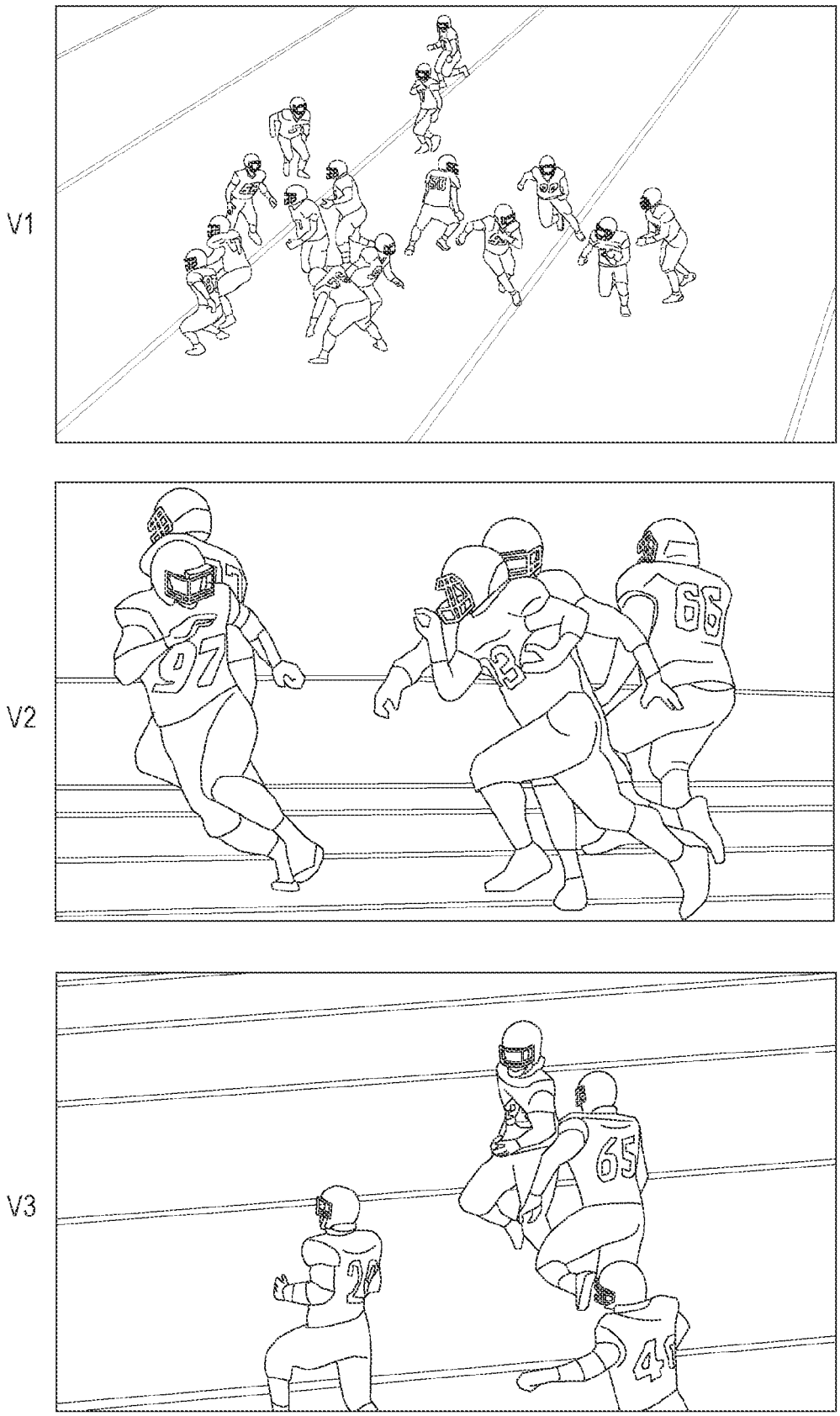
FIG. 3 is a diagram illustrating an example of a video captured by each imaging device.

By generating the clip collection CS on the basis of the auxiliary information SD, for example, as illustrated in FIG. 3, in a case where the first video V1 is a wide-angle video captured in a bird's eye view from the side of the field, the second video V2 is a telephoto video captured near the player holding a ball, and the third video V3 is a video captured from a goal post side, the clip videos CV cut out from each video can be combined in an appropriate order.

Note that the auxiliary information SD indicating the combination order may be different depending on the scene type. For example, the scoring scene may be started from the wide-angle video, and the fouling scene may be started from the telephoto video.

In addition, the auxiliary information SD may be information indicating whether or not the video is broadcast. There is a possibility that the viewer has already viewed the broadcast video VA for the game.

Even if such a viewer is caused to view the same video, meaningful information is not provided to the viewer. Therefore, it is conceivable to generate the digest video DV to include the video captured from an angle at which the viewer is not viewing. The auxiliary information SD indicating whether or not the video is a broadcast video is used to select the clip collection CS or the clip video CV in such a case.

The clip collection generation unit 11 generates the clip video CV on the basis of the auxiliary information SD. Specifically, by presenting the specified auxiliary information SD such as the player name to the video analysis unit 4, the video analysis unit 4 is caused to determine the in-point and the out-point of the video in which the player is imaged and generate the clip video CV.

The clip collection generation unit 11 combines the clip videos CV to generate the clip collection CS. The combination order of the clip video CV may be based on the auxiliary information SD or may be a predetermined order.

That is, the clip collection generation unit 11 generates the clip collection CS by using the analysis result of the image analysis processing by the video analysis unit 4 and the auxiliary information SD.

Note that when two clip videos CV are combined, the clip collection generation unit 11 may insert, between the clip videos CV, an image representing that the video is switched.

The digest video generation unit 12 combines the clip collections CS generated by the clip collection generation unit 11 to generate the digest video DV.

The combination order of the clip collections CS is determined, for example, along the occurrence time of each scene. An image or the like representing that the video is switched may be inserted between the clip collections CS.

The generated digest video DV may be posted on the SNS or uploaded on a web page.

2. Processing Flow

Some examples of processing executed by the information processing apparatus 1 will be described.

<2-1. First Processing Flow>

Figure 4:
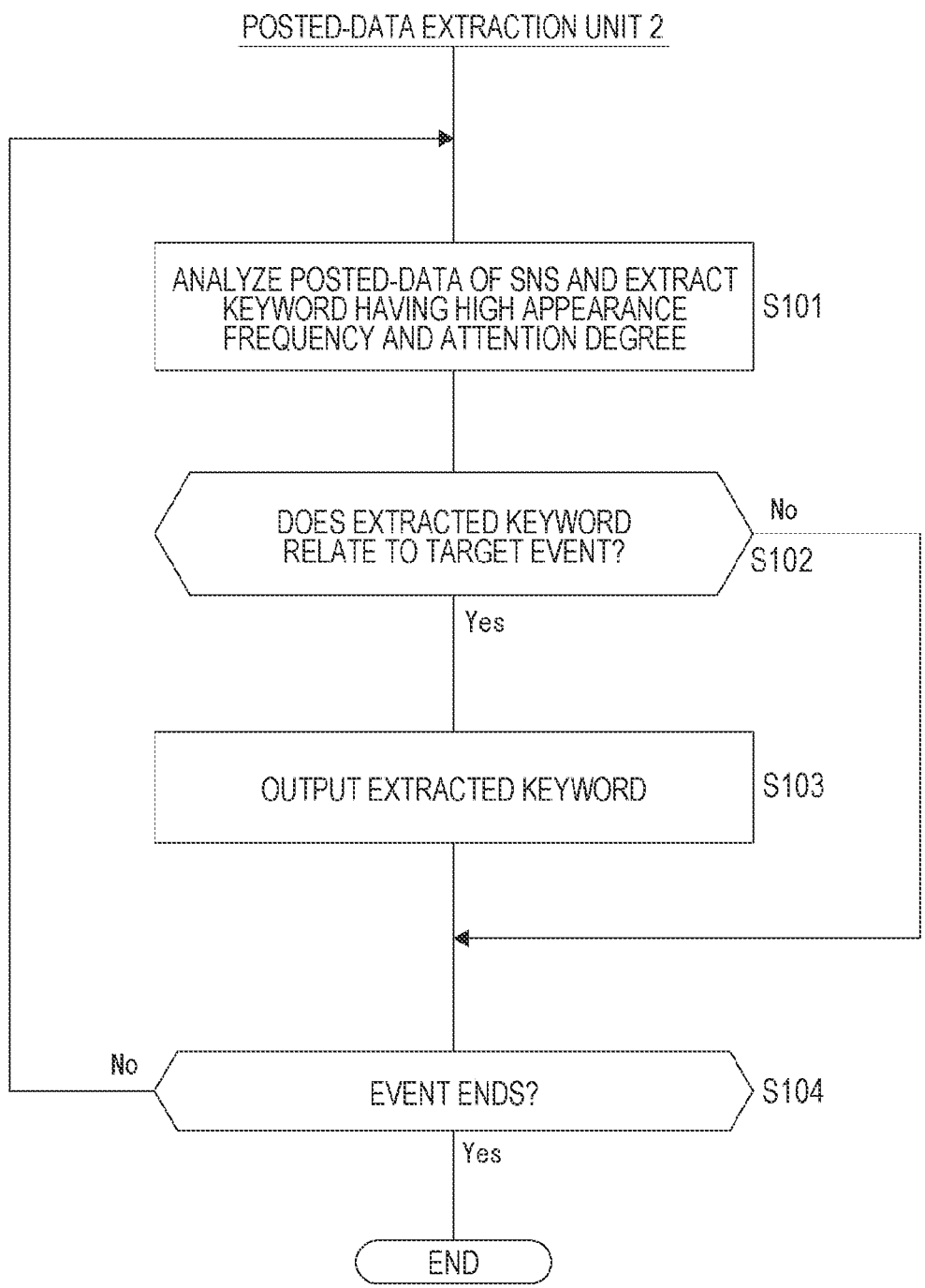
FIG. 4 is a diagram illustrating a first processing flow illustrated together with each of FIGS. 5 to 7.
Figure 5:
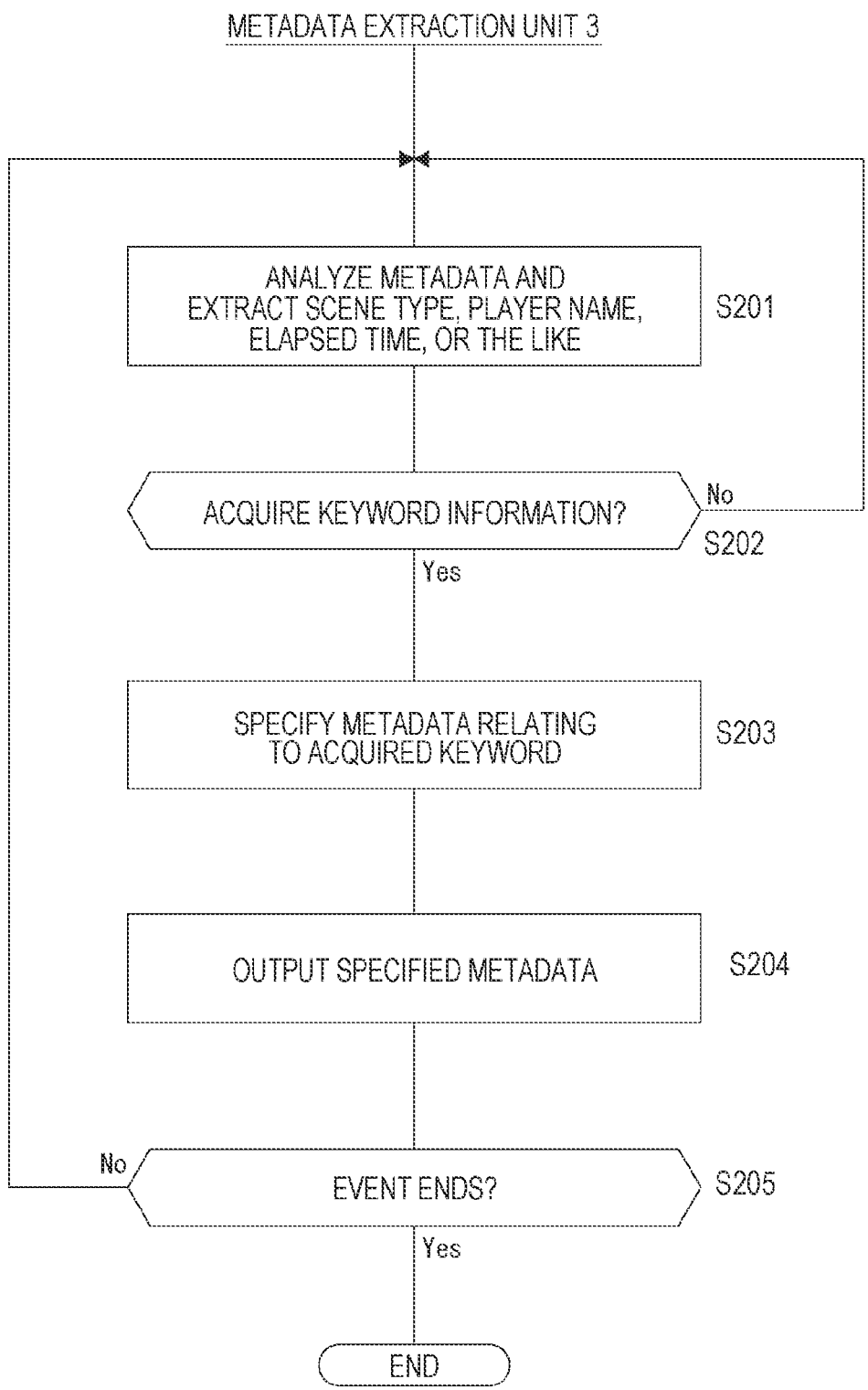
FIG. 5 is a flowchart illustrating an example of processing executed by a metadata extraction unit in the first processing flow.
Figure 6:
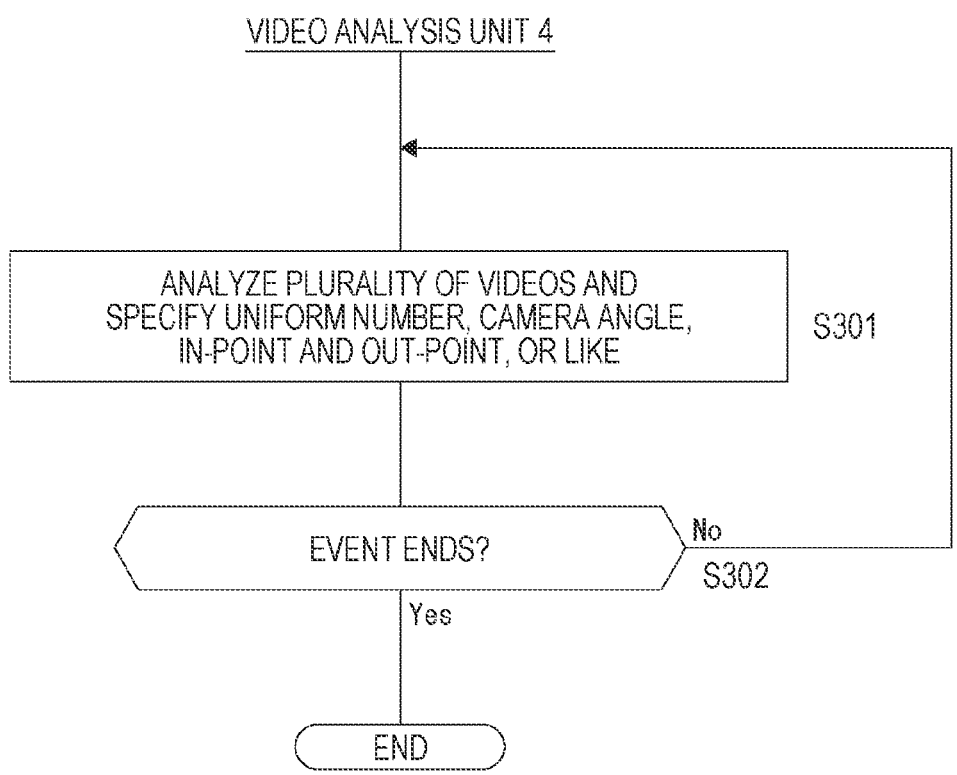
FIG. 6 is a flowchart illustrating an example of processing executed by a video analysis unit in the first processing flow.
Figure 7:
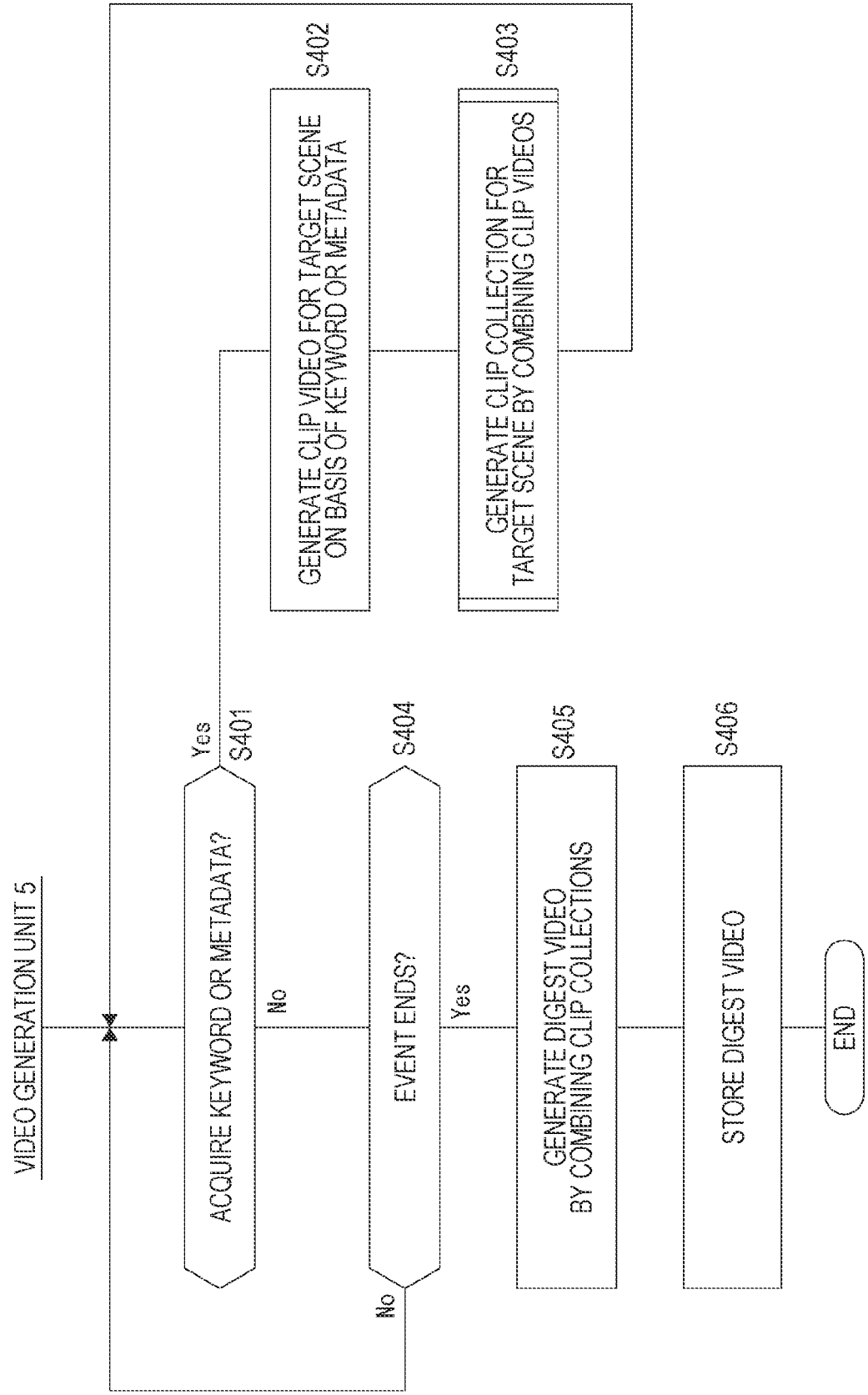
FIG. 7 is a flowchart illustrating an example of processing executed by the video generation unit in the first processing flow.

An example of a first processing flow is illustrated in each of FIGS. 4 to 7. Specifically, FIG. 4 illustrates an example of the processing flow executed by the posted-data extraction unit 2 of the information processing apparatus 1, FIG. 5 illustrates an example of the processing flow executed by the metadata extraction unit 3, FIG. 6 illustrates an example of the processing flow executed by the video analysis unit 4, and FIG. 7 illustrates the example of a processing flow executed by the video generation unit 5.

In step S101 of FIG. 4, the posted-data extraction unit 2 analyzes the posted-data of the SNS. By this analysis processing, a keyword having a high appearance frequency or a keyword having a high attention degree is extracted. These keywords are, for example, the player name and the scene type described above.

Next, in step S102, the posted-data extraction unit 2 determines whether or not the extracted keyword relates to a target event. Specifically, it is determined whether or not the person of the extracted name exists as a member of a team participating in a game for which the digest video DV is to be generated, or whether or not the extracted keyword relates to the target game.

In a case where it is determined that the extracted keyword relates to the target event, in step S103, the posted-data extraction unit 2 performs processing of outputting the extracted keyword to the metadata extraction unit 3.

On the other hand, in a case where it is determined that the keyword does not relate to the target event, in step S104 without performing the processing of step S103, the posted-data extraction unit 2 determines whether or not the event has ended.

In a case where it is determined that the event has not ended, the posted-data extraction unit 2 returns to the processing of step S101 to continue the extraction of the keyword.

On the other hand, in a case where it is determined that the event has ended, the posted-data extraction unit 2 ends a series of processing illustrated in FIG. 4.

Note that FIG. 4 and the following drawings are examples of generating the clip collection CS for generating the digest video DV in parallel with the progress of the event, and thus, the processing of determining whether or not the event has ended in step S104 is executed.

On the other hand, in a case where the clip collection CS and the digest video DV are generated after the end of the event, instead of the determination processing of step S104, it is only required to execute processing of determining whether or not the extraction of the keyword or the like has been completed for all the pieces of posted-data posted on the SNS in the time zone in which the event has been held.

As the posted-data extraction unit 2 executes the series of processing illustrated in FIG. 4, keywords are continuously extracted from the posted-data on the SNS from the start of an event such as a sports game to the end of the event, and are appropriately output to the metadata extraction unit 3.

In parallel with the execution of the processing illustrated in FIG. 4 by the posted-data extraction unit 2, the metadata extraction unit 3 executes a series of processing illustrated in FIG. 5.

Specifically, in step S201, the metadata extraction unit 3 analyzes the metadata acquired from the metadata server 200 and extracts information for specifying a scene occurring in the event. For example, in the case of an American football game, the time when a scene corresponding to touch-down, which is one of scene types, occurs, the name of a player who gets a score by touch-down, information on a change in score by touch-down, and the like are extracted.

Subsequently, in step S202, the metadata extraction unit 3 determines whether or not the keyword extracted from the post of the SNS has been obtained from posted-data extraction unit 2.

In a case where the keyword information is not obtained, the metadata extraction unit 3 returns to the processing of step S201.

In a case where the keyword information is obtained, the metadata extraction unit 3 specifies the metadata relating to the keyword acquired in step S203.

Subsequently, in step S204, the metadata extraction unit 3 outputs the specified metadata to the video analysis unit 4.

Then, in step S205, the metadata extraction unit 3 determines whether or not the event has ended.

In a case where it is determined that the event has not ended, the metadata extraction unit 3 returns to the processing of step S201 to perform processing of analyzing the metadata.

On the other hand, in a case where it is determined that the event has ended, the metadata extraction unit 3 ends the series of processing illustrated in FIG. 5.

When the metadata extraction unit 3 executes the series of processing illustrated in FIG. 5, the analysis processing of the metadata accumulated in the metadata server 200 as an external information processing apparatus is continuously executed from the start of an event such as a sports game to the end of the event, and the information of each scene occurring during the game is extracted.

In parallel with the execution of the processing illustrated in FIG. 4 by the posted-data extraction unit 2 and the execution of the processing illustrated in FIG. 5 by the metadata extraction unit 3, the video analysis unit 4 executes a series of processing illustrated in FIG. 6.

In step S301, the video analysis unit 4 performs video analysis by performing image recognition processing on a plurality of videos such as the first video V1, the second video V2, the third video V3, and the broadcast video VA, and identifies the uniform number captured in the video, the face of the player, a ball, and the like. Furthermore, the video analysis unit 4 may further specify a camera angle, or may specify an in-point and an out-point for generating the clip video CV.

In the face recognition processing, likelihood information indicating the likelihood of the recognition result may be calculated. The likelihood information is used for video selection processing in the video generation unit 5 in a subsequent stage.

The information specified by the image recognition processing is stored in association with time information such as a game elapsed time and an elapsed time from the start of recording for each of the plurality of videos.

In step S302, the video analysis unit 4 determines whether or not the event has ended.

In a case where it is determined that the event has not ended, the video analysis unit 4 returns to the processing of step S301 to continue the video analysis processing.

On the other hand, in a case where it is determined that the event has ended, the video analysis unit 4 ends the series of processing illustrated in FIG. 6.

By the video analysis unit 4 executing the series of processing illustrated in FIG. 6, various types of information are extracted for a video captured from the start of an event such as a sports game to the end of the event.

The video generation unit 5 generates the digest video DV according to the processing results of the posted-data extraction unit 2, the metadata extraction unit 3, and the video analysis unit 4.

Specifically, in step S401 of FIG. 7, the video generation unit 5 determines whether or not the keyword or the metadata has been acquired.

In a case where the keyword posted on the SNS is acquired from the posted-data extraction unit 2 or a case where the information regarding the metadata is acquired from the metadata extraction unit 3, the video generation unit 5 proceeds to step S402 and performs processing of generating the clip video CV for the target scene on the basis of the keyword or the metadata. This processing generates the clip video CV on the basis of the in-point and the out-point specified by the video analysis unit 4 for the target scene.

After generating the clip video CV, in step S403, the video generation unit 5 generates the clip collection CS for the target scene by combining the clip videos CV. For example, the clip video CV may be generated by combining the first video V1, the second video V2, and the third video V3 in a predetermined order.

Alternatively, a template may be prepared such that the videos are combined in the order of predetermined camera angles according to the scene type, and the clip video CV may be combined in the optimum order by applying every clip video CV to the template on the basis of the information of the camera angle of each imaging device CA.

After generating the clip video CV, the video generation unit 5 returns to the processing of step S401.

In a case where it is determined in the determination processing of step S401 that the keyword or the metadata is not acquired, the video generation unit 5 proceeds to step S404 and determines whether or not the event has ended.

In a case where it is determined that the event has not ended yet, the video generation unit 5 returns to step S401 to continue the generation of the clip video CV and the clip collection CS.

On the other hand, in a case where it is determined that the event has ended, the video generation unit 5 proceeds to step S405, and combines the clip collections CS to generate the digest video DV.

The digest video DV is basically generated by combining the clip collections CS for each scene occurring during the game in chronological order.

Note that, in a case where the reproduction time length of the digest video DV is limited, the digest video DV is generated while selection is performed from the clip collection CS such that the clip collection CS with high priority is included.

The clip collection CS with high priority is a clip collection CS corresponding to a scene where any team scores, a clip collection CS corresponding to a scene estimated from the posted-data of the SNS to have a high concern of the viewer, or the like.

Note that, in the selection of the clip collection CS, the posted-data posted during a predetermined period (10 minutes, 30 minutes, or the like) after the end of the game may be used. For example, it is estimated that the posted-data posted during the predetermined period after the end of the game includes posts summarizing the game, posts referring to a scene that is desired to be seen again in the game, and the like.

By selecting the clip collection CS on the basis of such posted-data, it is possible to generate the digest video DV in which the viewer has a high interest/concern.

After generating the digest video DV, in step S406, the video generation unit 5 performs processing of storing the digest video DV. A location where the digest video DV is stored may be a storage unit inside the information processing apparatus 1 or may be a storage unit of a server device different from the information processing apparatus 1.

<2-2. Second Processing Flow>

An example of the second processing flow is illustrated in each of FIGS. 8 to 11. Note that processing similar to the processing described in the first processing flow is denoted by the same step number, and description thereof will be omitted as appropriate.

Figure 8:
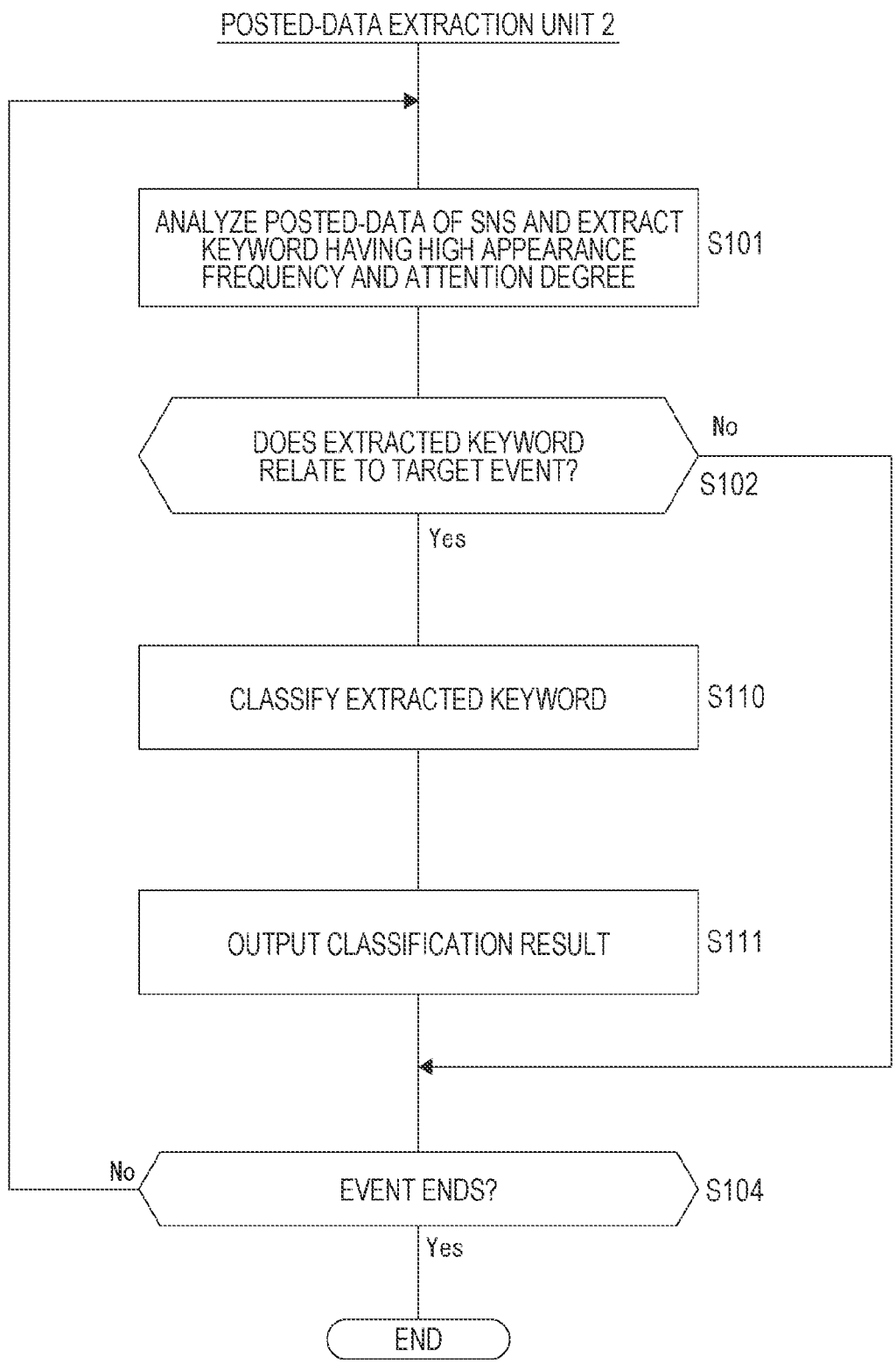
FIG. 8 is a diagram illustrating a second processing flow illustrated together with each of FIGS. 9 to 11.

In step S101 of FIG. 8, the posted-data extraction unit 2 analyzes the posted-data of the SNS. By this analysis processing, a keyword having a high appearance frequency such as a player name or a scene type or a keyword having a high attention degree is extracted.

Next, in step S102, the posted-data extraction unit 2 determines whether or not the extracted keyword relates to a target event.

In a case where it is determined that the extracted keyword relates to the target event, in step S110, the posted-data extraction unit 2 performs processing of classifying the extracted keyword.

For example, the extracted keywords are classified into any of keywords relating to a person such as a player, a referee, or a manager, keywords relating to a scoring scene such as a field goal or a touch-down, and keywords relating to a fouling scene such as off-side or holding.

Note that the three classifications described herein are merely examples, and the keywords may be classified into other categories.

After classifying the keywords, in step S111, the posted-data extraction unit 2 outputs a classification result to the metadata extraction unit 3.

On the other hand, in a case where it is determined that the posted-data does not relate to the target event, or after step S111 is executed, in step S104 without performing each processing of step S110 and step S111, the posted-data extraction unit 2 determines whether or not the event has ended.

In a case where it is determined that the event has not ended, the posted-data extraction unit 2 returns to the processing of step S101 to continue the extraction of the keyword.

On the other hand, in a case where it is determined that the event has ended, the posted-data extraction unit 2 ends a series of processing illustrated in FIG. 8.

Figure 9:
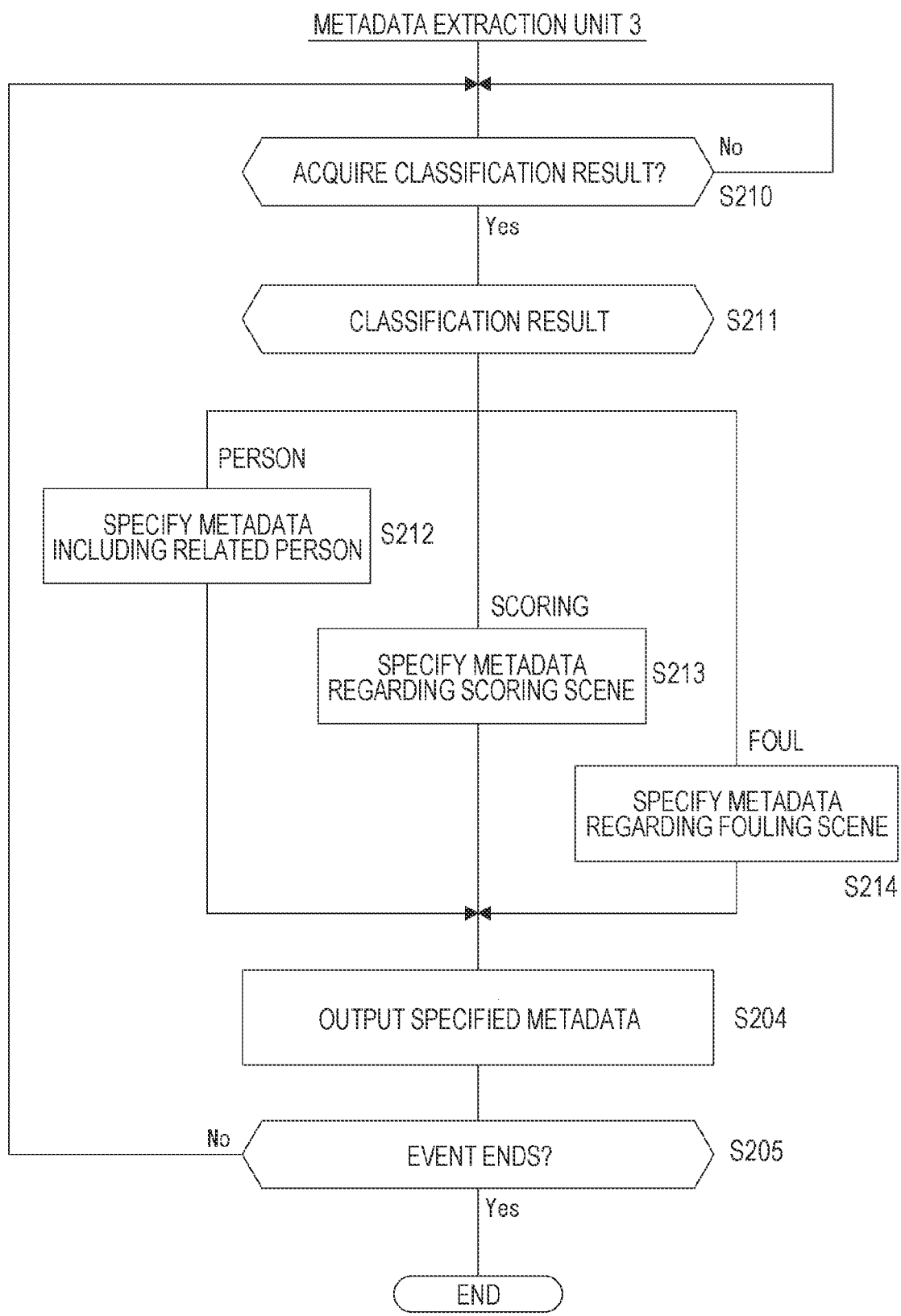
FIG. 9 is a flowchart illustrating an example of processing executed by the metadata extraction unit in the second processing flow.

In parallel with the execution of the processing illustrated in FIG. 8 by the posted-data extraction unit 2, the metadata extraction unit 3 executes a series of processing illustrated in FIG. 9.

In step S210 of FIG. 9, the metadata extraction unit 3 determines whether or not the keyword classification result has been acquired.

In a case where it is determined that the classification result has been acquired, in step S211, the metadata extraction unit 3 performs branch processing corresponding to the classification result.

For example, in a case where the extracted keyword relates to a person, in step S212, the metadata extraction unit 3 specifies the metadata including the person relating to the keyword.

Alternatively, in a case where the extracted keyword relates to a scoring scene, in step S213, the metadata extraction unit 3 specifies the metadata regarding the scoring scene.

Furthermore, in a case where the extracted keyword relates to a fouling scene, in step S214, the metadata extraction unit 3 specifies the metadata regarding the fouling scene.

After performing any one of steps S212, S213, and S214, the metadata extraction unit 3 proceeds to step S204, and outputs the specified metadata and the above-described classification result to the video analysis unit 4.

Then, in step S205, the metadata extraction unit 3 determines whether or not the event has ended.

In a case where it is determined that the event has not ended, the metadata extraction unit 3 returns to the processing of step S210 to perform acquisition determination of the classification result.

On the other hand, in a case where it is determined that the event has ended, the metadata extraction unit 3 ends the series of processing illustrated in FIG. 9.

Figure 10:
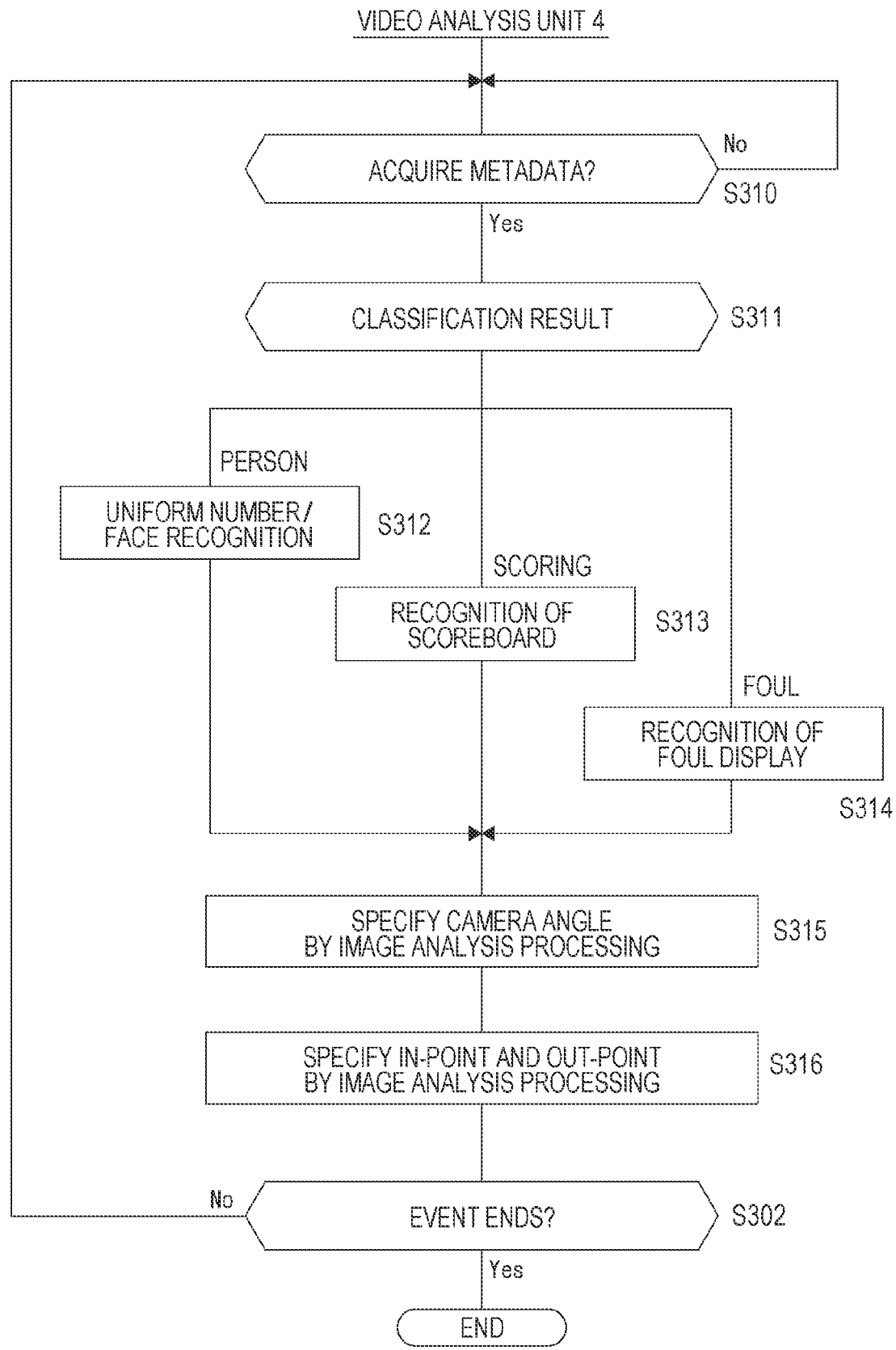
FIG. 10 is a flowchart illustrating an example of processing executed by the video analysis unit in the second processing flow.

In parallel with the processing illustrated in FIG. 8 by the posted-data extraction unit 2 and the processing illustrated in FIG. 9 by the metadata extraction unit 3, the video analysis unit 4 executes a series of processing illustrated in FIG. 10.

In step S310, the video analysis unit 4 determines whether or not the metadata or the classification result has been acquired from metadata extraction unit 3.

In a case where it is determined that the metadata is not acquired, the video analysis unit 4 executes the processing of step S310 again.

On the other hand, in a case where it is determined that the metadata is acquired, the video analysis unit 4 proceeds to step S311 and performs branch processing corresponding to the classification result.

For example, in a case where the metadata relates to a person, in step S312, the video analysis unit 4 performs uniform number recognition and face recognition by the image recognition processing in order to specify the time zone in which the specified person is imaged.

Alternatively, in a case where the metadata relates to the scoring scene, the video analysis unit 4 performs scoreboard recognition by the image recognition processing in order to specify the scoring scene in step S313.

In the scoreboard recognition by the image recognition processing, for example, processing of detecting a place where a scoreboard installed in a venue is imaged and extracting the score of the scoreboard may be performed, or a change in the scores of both teams may be detected by analyzing the broadcast video VA to recognize subtitles, graphics, and the like superimposed on the captured image.

Note that, since the metadata shows the time when the scoring scene occurs, it is only required to perform the image recognition processing on a video in a predetermined range around the specified time, instead of performing the image recognition processing on the entire captured video. Therefore, it is possible to reduce the processing load according to the image recognition processing and shorten the processing time.

Furthermore, in a case where the extracted keyword relates to the fouling scene, the video analysis unit 4 detects a foul display by the image recognition processing in order to specify the fouling scene in step S314.

As the image recognition processing for specifying the fouling scene, for example, the occurrence timing of the fouling scene may be specified by recognizing a yellow flag thrown into a field, or the fouling scene may be specified by analyzing the broadcast video VA to recognize subtitles, graphics, or the like superimposed on the captured image.

Furthermore, in the case of soccer, by detecting the posture of the referee, a scene in which the referee holds up a yellow card or a red card against a target player may be specified as the fouling scene.

Also in the image analysis processing of step S314, similarly to step S313, it is only required to perform the processing on the video of a predetermined section on the basis of the metadata.

After executing any of steps S312, S313, and S314, the video analysis unit 4 proceeds to step S315 and specifies the camera angle by the image analysis processing.

The information of the camera angle specified here is used in processing of generating the clip collection CS in a subsequent stage.

Subsequently, in step S316, the video analysis unit 4 executes image analysis processing for specifying an in-point and an out-point.

Note that the in-point and the out-point may be determined based on the scene occurrence timing. For example, fifteen seconds before the scene occurrence timing may be set as the in-point, and twenty seconds after the in-point may be set as the out-point.

In step S302, the video analysis unit 4 determines whether or not the event has ended.

In a case where it is determined that the event has not ended, the video analysis unit 4 returns to the processing of step S310.

On the other hand, in a case where it is determined that the event has ended, the video analysis unit 4 ends the series of processing illustrated in FIG. 10.

The video generation unit 5 generates the digest video DV according to the processing results of the posted-data extraction unit 2, the metadata extraction unit 3, and the video analysis unit 4.

Figure 11:
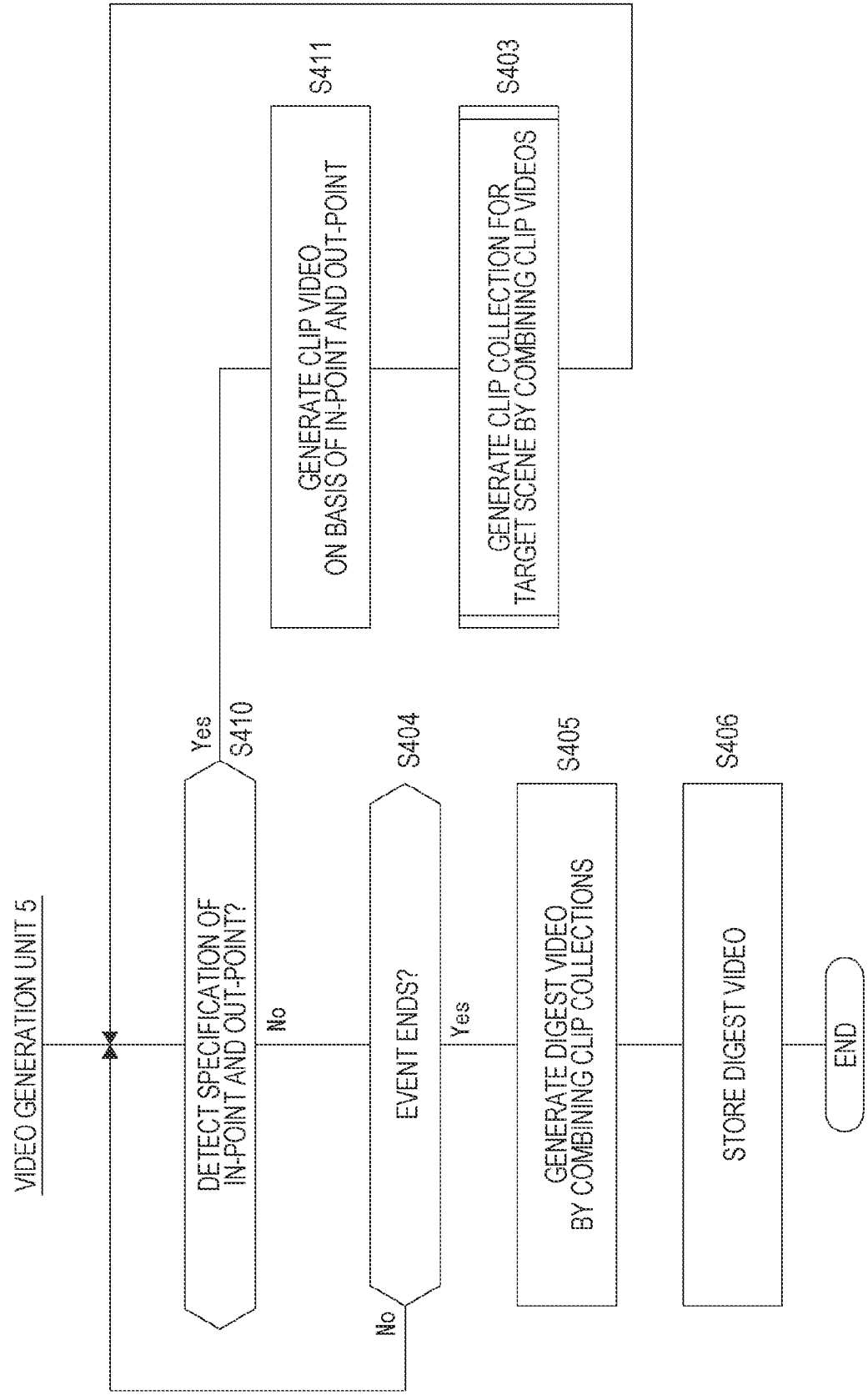
FIG. 11 is a flowchart illustrating an example of processing executed by the video generation unit in the second processing flow.

Specifically, in step S410 of FIG. 11, the video generation unit 5 determines whether or not it is detected that the in-point and the out-point have been specified.

In a case where it is detected that the in-point and the out-point have been specified, the video generation unit 5 proceeds to step S411 and performs processing of generating the clip video CV on the basis of the in-point and the out-point.

After generating the clip video CV, in step S403, the video generation unit 5 generates the clip collection CS for the target scene by combining the clip videos CV.

After generating the clip video CV, the video generation unit 5 returns to the processing of step S410.

In a case where it is determined in the determination processing of step S410 that the in-point and the out-point have not been specified, the video generation unit 5 proceeds to step S404 and determines whether or not the event has ended.

In a case where it is determined that the event has not ended yet, the video generation unit 5 returns to step S410.

On the other hand, in a case where it is determined that the event has ended, the video generation unit 5 proceeds to step S405 and generates the digest video DV by combining the clip collections CS, and in subsequent step S406, performs processing of storing the digest video DV.

<2-3. Third Processing Flow>

A third processing flow is an example in a case where the digest video DV is generated without using the metadata.

A specific description will be given with reference to each of FIGS. 8, 10, and 11.

The posted-data extraction unit 2 executes the series of processing illustrated in FIG. 8 to extract and classify keywords related to the event. The classification result is output to the video analysis unit 4 in step S111.

The metadata extraction unit 3 does not need to analyze the metadata, and therefore does not perform the processing.

In step S310 of FIG. 10, the video analysis unit 4 determines whether or not the classification result of the keyword is acquired, instead of determining whether or not the metadata has been acquired.

Then, each processing of steps S311 to S316 is appropriately executed according to the keyword classification result.

The video generation unit 5 generates the digest video DV by executing a series of processing illustrated in FIG. 11.

As described above, the digest video DV having appeal power to the viewer can be generated using only the posted-data on the SNS without using the metadata.

<2-4. Flow of Processing of Generating Clip Collection>

A specific flow of the processing of generating the clip collection CS described in step S403 of FIGS. 7 and 11 will be described.

A first example is an example in which different templates are used for every type of scene.

Figure 12:
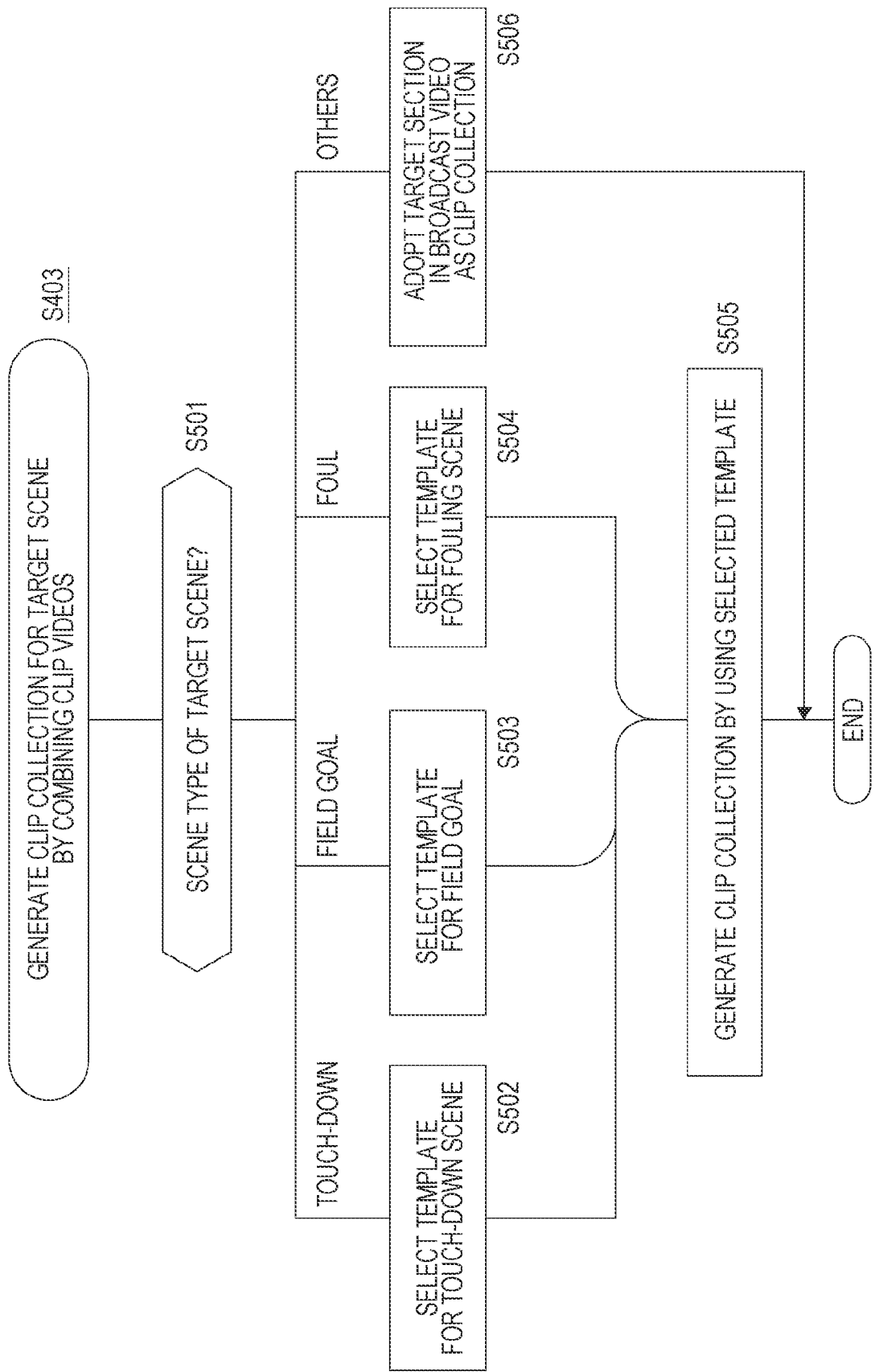
FIG. 12 is a flowchart illustrating an example of processing of generating a clip collection.

In step S501 of FIG. 12, the video generation unit 5 performs branch processing corresponding to the scene type of the target scene. The type of the target scene may be estimated from the keyword, or may be determined on the basis of the metadata.

In a case where the scene type is a touch-down scene, in step S502, the video generation unit 5 selects a template for the touch-down scene.

As described above, the template is information that defines in what order the videos of what camera angles are combined.

In a case where the scene type is a field goal scene, in step S503, the video generation unit 5 selects a template for the field goal scene.

In a case where the scene type is a fouling scene, in step S504, the video generation unit 5 selects a template for the fouling scene.

After selecting any template in step S502, S503, or S504, in step S505, the video generation unit 5 executes processing of generating the clip collection CS by using the selected template.

Furthermore, in a case where it is determined in step S501 that the scene type does not correspond to any of the scenes, in step S506, the video generation unit 5 adopts the target section in the broadcast video VA as the clip collection CS.

The target section may be determined, for example, on the basis of the posting time to the SNS, or may be determined on the basis of the scene occurrence time in the metadata.

After executing the processing of step S505 or S506, the video generation unit 5 ends the processing of generating the clip collection CS.

In another example, the determination of the in-point and the out-point for not only the generation of the clip collection CS but also the generation of the clip video CV are performed corresponding to the scene type of the target scene.

Specifically, the processing is executed instead of step S402 and step S403 in FIG. 7, and is executed instead of step S411 and step S403 in FIG. 11. This processing will be described as step S421 (see FIG. 13).

In step S501, the video generation unit 5 performs the branch processing corresponding to the scene type of the target scene.

In a case where the scene type is a touch-down scene, in step S510, the video generation unit 5 determines an in-point and an out-point for the touch-down scene and generates the clip video CV. At this time, the in-point and the out-point may be determined, for example, such that the clip video CV has an optimum length.

Next, in step S502, the video generation unit 5 selects a template for the touch-down scene.

Furthermore, in a case where the scene type is a field goal scene, in step S511, the video generation unit 5 determines the in-point and the out-point for the field goal scene and generates the clip video CV.

Next, in step S503, the video generation unit 5 selects a template for the field goal scene.

Moreover, in a case where the scene type is a fouling scene, in step S512, the video generation unit 5 determines an in-point and an out-point for the fouling scene and generates the clip video CV.

Next, in step S504, the video generation unit 5 selects a template for the fouling scene.

After executing any one of steps S502, S503, and S504, in step S505, the video generation unit 5 executes processing of generating the clip collection CS by using the selected template.

Furthermore, in a case where it is determined in step S501 that the scene type does not correspond to any of the scenes, in step S506, the video generation unit 5 adopts the target section in the broadcast video VA as the clip collection CS.

The target section may be determined, for example, on the basis of the posting time to the SNS, or may be determined on the basis of the scene occurrence time in the metadata.

After executing the processing of step S505 or S506, the video generation unit 5 ends the processing of generating the clip collection CS.

Figure 13:
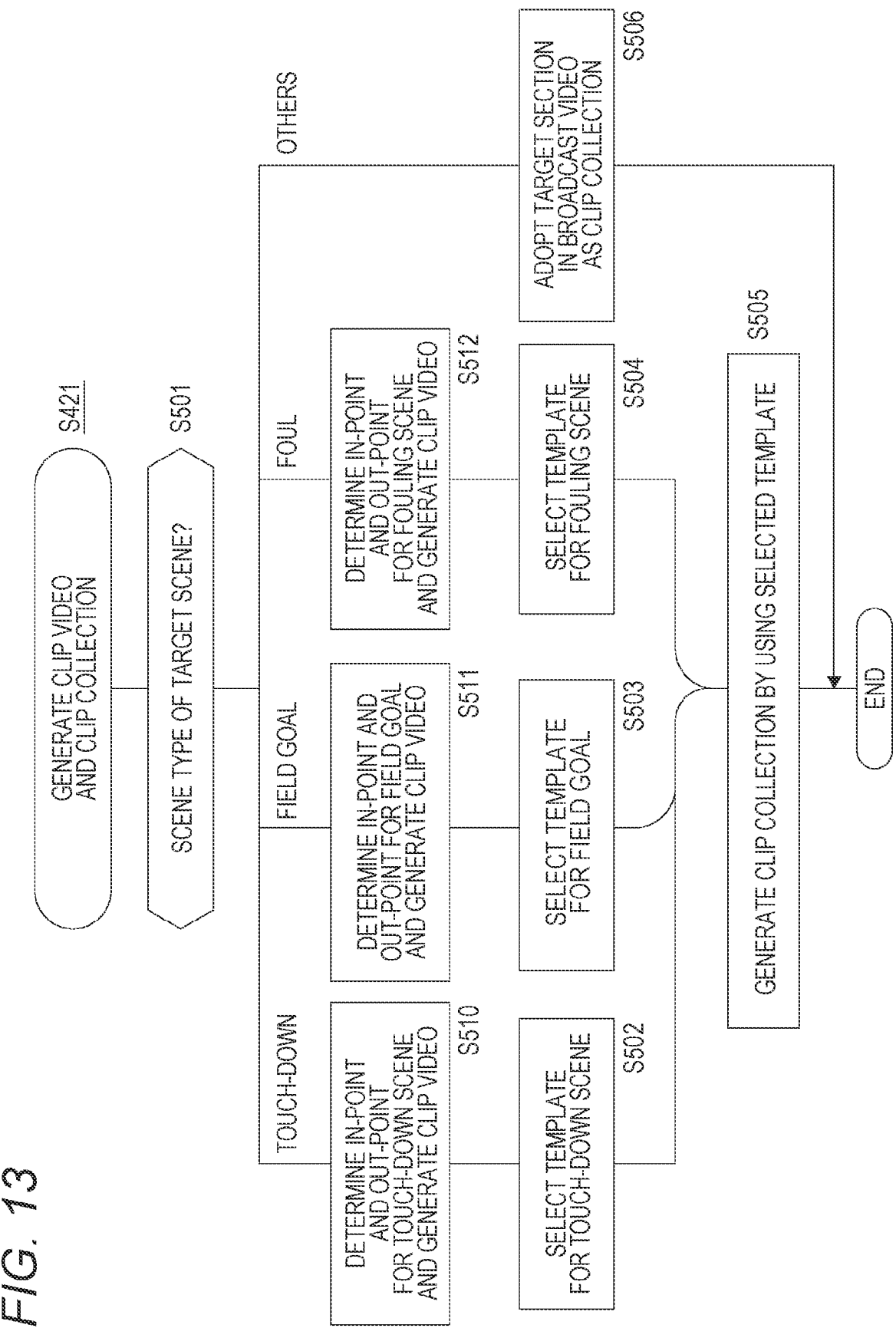
FIG. 13 is a flowchart illustrating an example of processing of generating a clip video and the clip collection.

Note that, in FIGS. 12 and 13, an example is illustrated in which one template is prepared for the fouling scene, but different templates may be prepared according to the type of foul. Furthermore, templates may be prepared not only for the illustrated cases but also for other scene types such as an injury scene.

3. Scoring

<3-1. Scoring Method>

In a case where the reproduction time length of the clip collection CS is limited, it may not be possible to combine all the selected clip videos CV. In such a case, scoring processing of adding a score to each clip video CV may be performed such that the clip video CV having a high score is preferentially included in the clip collection CS.

FIG. 14 illustrates an example of scores assigned, as a result of scoring with respect to the size of the subject, to the clip video CV for each imaging device CA and scores assigned, as a result of scoring with respect to the orientation of the subject, to the clip video CV. Note that each score is a value in a range of 0 to 1, and the larger the value, the better the score.

The first video V1 is a bird's-eye view video and the subject is imaged in a small size, so that the score for the size of the subject is 0.02. Furthermore, also regarding the orientation of the subject, the subject is small, so that the orientation is difficult to understand, and parts of the face of the subject cannot be clearly discriminated, so that the score for the orientation of the subject is 0.1.

The second video V2 is a telephoto video in which a player holding a ball is largely projected, and the score for the size of the subject is 0.85. Furthermore, the orientation of the subject faces the front with respect to the imaging device CA and the parts of the face of the subject are clearly imaged, so that the score for the orientation of the subject is 0.9.

The third video V3 is a bird's-eye view video obtained by imaging a relatively narrow area, and the size of the subject also is not so large, so that the score for the size of the subject is 0.1. Furthermore, also regarding the orientation of the subject, the subject is small, so that the orientation is difficult to understand, and parts of the face of the subject cannot be clearly discriminated, so that the score for the orientation of the subject is 0.1.

A fourth video V4 is a video captured by a fourth imaging device CA4. The fourth video V4 is a telephoto video in which the subject is largely imaged, and the score for the size of the subject is 0.92. However, the orientation of the subject does not directly face the imaging device CA, so that the score for the orientation of the subject is 0.1.

In a case where priority is given to a video in which the subject appears large, the fourth video V4 is preferentially selected.

Furthermore, in a case where priority is given to a video obtained by imaging the front of the subject, the second video V2 is preferentially selected.

As described above, by selecting the clip video CV with reference to scores varying depending on the purpose, it is possible to generate the clip collection CS and the digest video DV having appeal power.

Note that the scoring may be calculated not only for each clip video CV but also for each clip collection CS including a plurality of clip videos CV.

Then, in a case where the clip collection CS included in the digest video DV is selected, the clip collection CS in which the score, which is assigned by the scoring, for each clip collection CS is high may be easily included.

Furthermore, in the scoring processing of the clip video CV, the clip video CV including the captured image assigned with the highest score may be selected, or the clip video CV may be selected on the basis of the average score of each captured image. The average score is, for example, an average of scores calculated for every captured image included in the clip video CV.

<3-2. Processing Flow in Video Selection Using Scores>

A specific processing procedure of the processing of generating the clip collection CS described in step S403 of FIGS. 7 and 11 will be described. In particular, in the present example, an example of generating the clip collection CS by using the score will be described.

Note that the scoring processing is executed by the video analysis unit 4 after step S301 in FIG. 6 or step S316 in FIG. 10. Therefore, in the stage of executing a series of processing illustrated in FIG. 15, various scores are assigned to every clip video CV.

Figure 15:
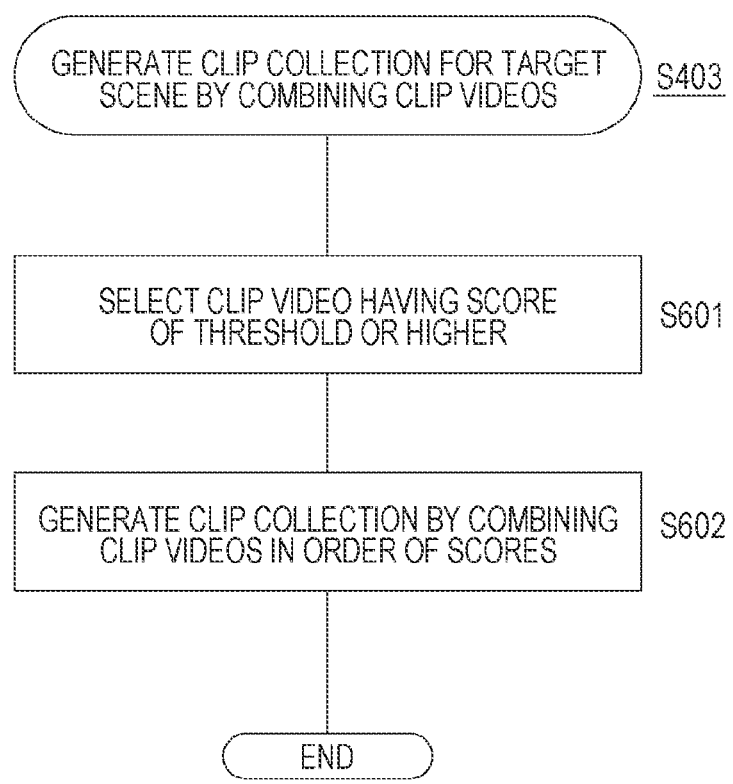
FIG. 15 is a flowchart illustrating an example of processing of combining clip videos to generate a clip collection for a target scene.

In step S601 of FIG. 15, the video generation unit 5 selects the clip video CV of which the score is equal to or higher than a threshold. Therefore, it is possible to omit a video which has a low score and is not attractive to the viewer.

In step S602, the video generation unit 5 generates the clip collection CS by combining the clip videos CV in order of scores.

The score assigned by the scoring processing can be regarded as an index indicating that the video is easy to see for the viewer and is appropriate for grasping what has occurred in the scene.

By sequentially combining the clip videos CV having higher scores to generate the clip collection CS, the viewer who has viewed the clip collection CS can correctly understand what has occurred in the scene. In other words, it is possible to prevent a state in which the viewer cannot understand the event occurring in the scene due to viewing of the clip video CV having a low score.

Figure 16:
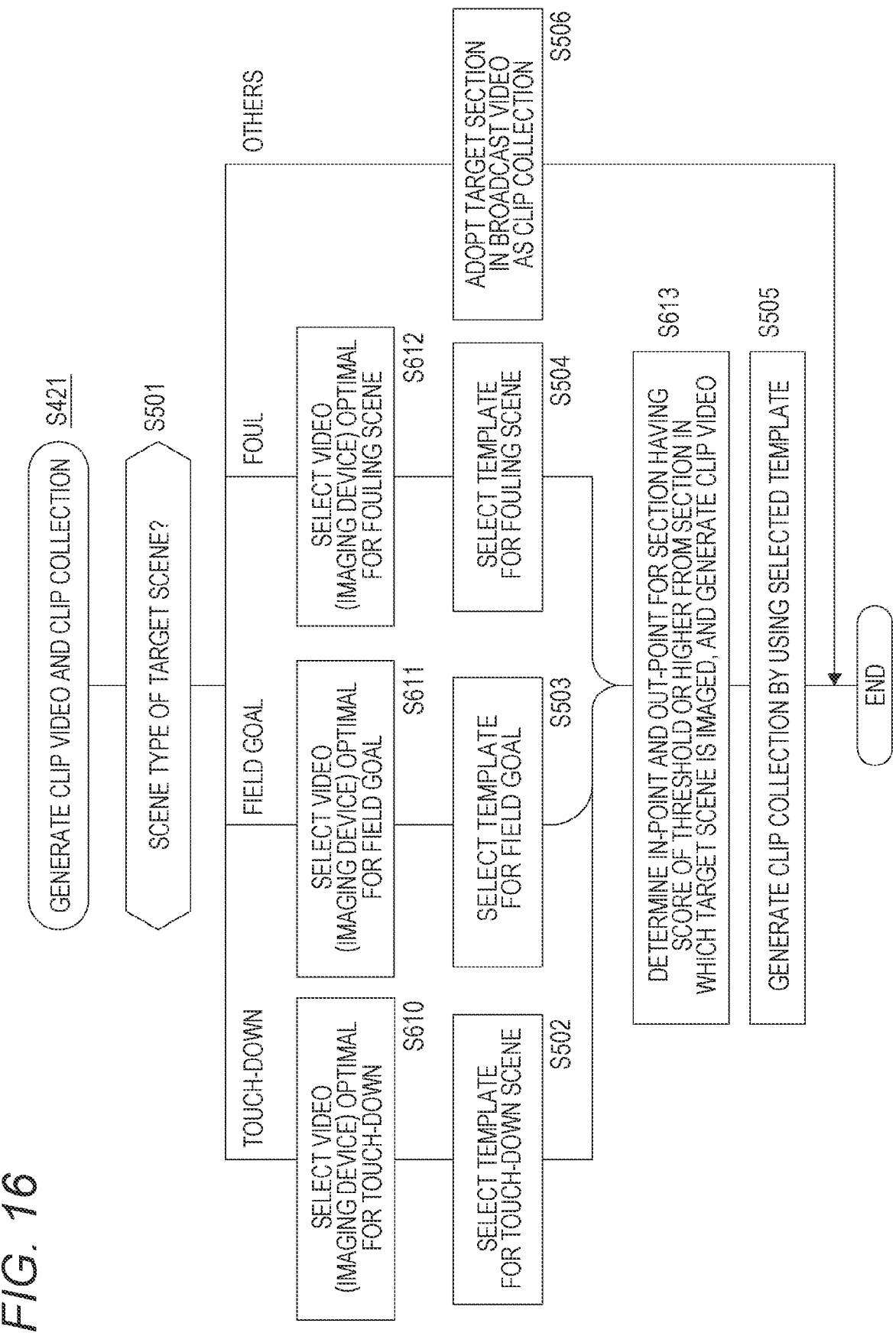
FIG. 16 is a flowchart illustrating an example of processing of generating the clip video and the clip collection.

Another example of the processing of generating the clip collection CS by using the score will be described with reference to FIG. 16.

Note that the present example is processing of generating the clip video CV and generating the clip collection CS, and is processing executed instead of steps S402 and S403 in FIG. 7 or processing executed instead of steps S411 and S403 in FIG. 11.

Similarly to the above-described example, this processing will be described as step S421 with reference to FIG. 16. Note that each processing illustrated in FIG. 16 will be described as being executed by the video generation unit 5, but some processing may be executed by the video analysis unit 4.

In step S501, the video generation unit 5 performs the branch processing corresponding to the scene type of the target scene.

In a case where the scene type is a touch-down scene, in step S610, the video generation unit 5 selects a video (imaging device CA) optimal for the touch-down scene. A plurality of videos may be selected. That is, a plurality of imaging devices CA may be selected.

Next, in step S502, the video generation unit 5 selects a template for the touch-down scene.

Furthermore, in a case where the scene type is a field goal scene, in step S611, the video generation unit 5 selects a video optimal for the field goal scene.

Next, in step S503, the video generation unit 5 selects a template for the field goal scene.

Moreover, in a case where the scene type is a fouling scene, in step S612, the video generation unit 5 selects a video optimal for the fouling scene.

Next, in step S504, the video generation unit 5 selects a template for the fouling scene.

After executing any one of steps S502, S503, and S504, in step S613, the video generation unit 5 determines an in-point and an out-point for a section, which has a score equal to or higher than the threshold, from a section in which the target scene is imaged, and generates the clip video CV. This processing is executed for every selected video.

Next, in step S505, the video generation unit 5 executes the processing of generating the clip collection CS by using the selected template.

Furthermore, in a case where it is determined in step S501 that the scene type does not correspond to any of the scenes, in step S506, the video generation unit 5 adopts the target section in the broadcast video VA as the clip collection CS.

The target section may be determined, for example, on the basis of the posting time to the SNS, or may be determined on the basis of the scene occurrence time in the metadata.

After executing the processing of step S505 or S506, the video generation unit 5 ends the processing of generating the clip collection CS.

Still another example of the processing of generating the clip collection CS by using the score will be described with reference to FIG. 17.

Note that the present example is processing of generating the clip video CV and generating the clip collection CS, and is processing executed instead of steps S402 and S403 in FIG. 7 or processing executed instead of steps S411 and S403 in FIG. 11.

Figure 17:
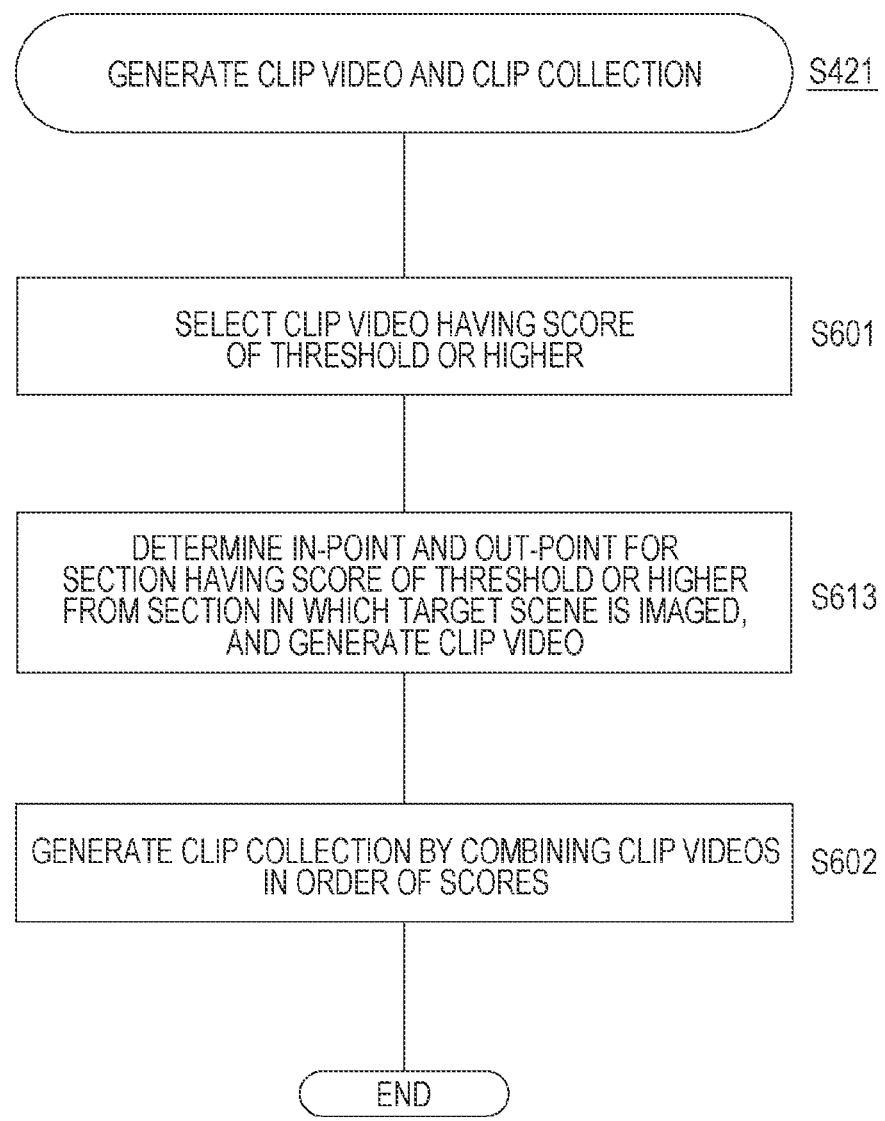
FIG. 17 is a flowchart illustrating another example of processing of generating the clip video and the clip collection.

In step S601 of FIG. 17, the video generation unit 5 selects the clip video CV of which the score is equal to or higher than the threshold. Therefore, it is possible to exclude a video which has a low score and is not attractive to the viewer.

In step S613, the video generation unit 5 cuts out the section, which has a score equal to or higher than the threshold, of the selected clip video CV, and newly generates the section as the clip video CV.

Specifically, the in-point and the out-point of the section which has a score higher than the threshold are determined to generate the clip video CV. This processing is executed for every selected video.

In step S602, the video generation unit 5 generates the clip collection CS by combining the clip videos CV in order of scores.

Therefore, the section with a high score is further carefully selected and cut out from the clip video CV with a high score, and thus, it is possible to generate the digest video DV or the like using only the video with the high interest/concern of the viewer.

4. Modifications

In the above-described example, it has been described that the posted-data is extracted from the SNS. Here, the extraction target of the posted-data may be a large number of unspecified accounts or may be specific accounts. By extracting posted-data from the large number of unspecified accounts, it is possible to further grasp the interest/concern of the viewer.

On the other hand, by extracting posted-data from specific accounts used by a person involved in a team, a person who makes a commentary of a game, or the like, it is possible to reduce a possibility of extracting erroneous information. That is, a certain amount of noise can be removed.

Furthermore, the extraction of the posted-data may be extraction of the posted-data itself or may be extraction of the information obtained after performing statistical processing on the posted-data. For example, the information may be information, such as a keyword having a high frequency of appearance in information posted in the latest predetermined time, which is extracted by the statistical processing.

These pieces of information may be extracted by the SNS server 100 which manages posts on the SNS, or may be obtained from another server device which analyzes posts of the SNS server 100.

An example in which the video analysis unit 4 analyzes the broadcast video VA has been described. At the time of analyzing the broadcast video VA, not only the image analysis processing but also voice analysis processing of analyzing the voice of a commentator or a reviewer may be performed. Therefore, it is possible to more specifically and accurately specify the scene occurring during the game, and it is also easy to specify the player related to the scene. Furthermore, the in-point and the out-point for generating the clip video CV may be determined by the voice analysis processing.

Furthermore, the occurrence timing of the scene may be grasped or the type of the scene may be specified by performing voice analysis on the cheers of the audience or the like.

In addition to the scene type described above, a rough play scene, a miss play scene, a good play scene, a commemorative play scene, or the like may be detected to be included in the digest video DV.

Note that the commemorative play is a play at the moment when a total score of a certain player reaches a predetermined numerical value, a play at the time of breaking a previous record, or the like.

In the example using the template, in a case where there is no corresponding video, the clip collection CS may be generated without combining the videos. For example, in a case where there is no enlarged video with the angle of view designated by the template, the clip collection CS is generated without including the video.

In some competitions, the gesture of the referee may be finely set according to the type of play or the type of foul.

In such a case, the dedicated imaging device CA for imaging the referee is arranged in the venue, and the posture or gesture of the referee is specified by the image analysis processing, so that the content of the play occurring during the game, that is, the scene type or the like can be specified.

The information of the scene type obtained in this manner can be used, for example, instead of the metadata.

Note that the referee to be subjected to the image analysis processing may include not only a chief referee but also a sub-referee and the like.

Furthermore, in the above-described example, an example has been described in which the digest video DV is generated by combining the plurality of clip collections CS, but the digest video DV may be generated by one clip collection CS. Specifically, in a case where there is one clip collection CS to be presented to the viewer, the digest video DV may be generated to include only one clip collection CS.

5. Computer Device

Figure 18:
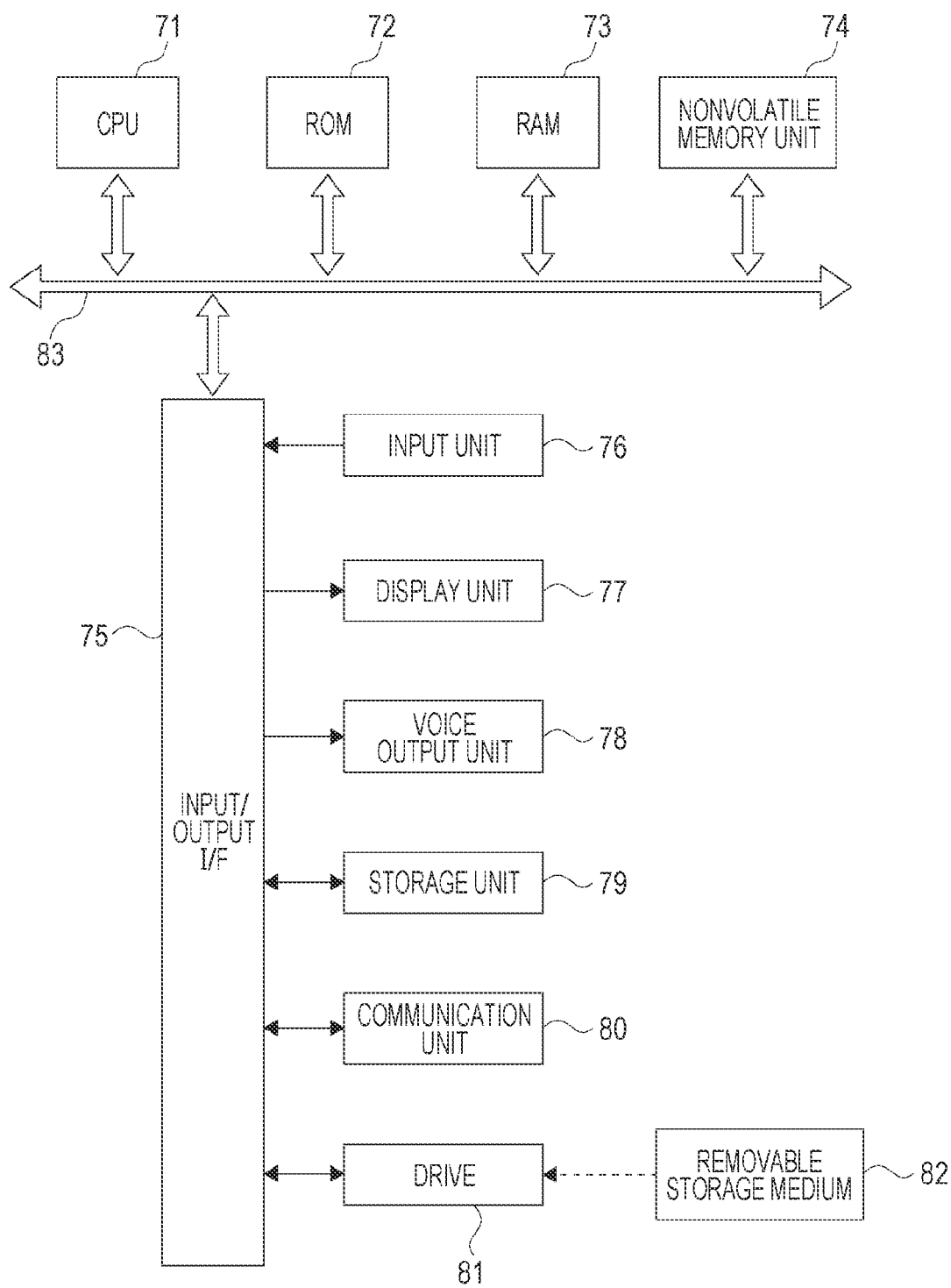
FIG. 18 is a block diagram of a computer device.

A configuration of a computer device including an arithmetic processing unit which realizes the above-described information processing apparatus 1 will be described with reference to FIG. 18.

A CPU 71 of the computer device functions as the arithmetic processing unit which performs the above-described various type of processing, and executes the various type of processing in accordance with a program stored in a nonvolatile memory unit 74 such as a ROM 72 or, for example, an electrically erasable programmable read-only memory (EEP-ROM), or a program loaded from a storage unit 79 to a RAM 73. In addition, the RAM 73 also appropriately stores data and the like necessary for the CPU 71 to execute the various types of processing.

The CPU 71, the ROM 72, the RAM 73, and the non-volatile memory unit 74 are connected to one another via a bus 83. An input/output interface (I/F) 75 is also connected to the bus 83.

An input unit 76 including an operation element and an operation device is connected to the input/output interface 75.

For example, as the input unit 76, various types of operation elements and operation devices such as a keyboard, a mouse, a key, a dial, a touch panel, a touch pad, a remote controller, and the like are assumed.

A user operation is detected by the input unit 76, and a signal corresponding to the input operation is interpreted by the CPU 71.

In addition, a display unit 77 including an LCD, an organic EL panel, or the like, and a voice output unit 78 including a speaker or the like are connected to the input/output interface 75 integrally or separately.

The display unit 77 is a display unit that performs various displays, and includes, for example, a display device provided in a housing of a computer device, a separate display device connected to the computer device, or the like.

The display unit 77 executes display of an image for various types of image processing, a moving image to be processed, and the like on a display screen on the basis of an instruction from the CPU 71. In addition, the display unit 77 displays various types of operation menus, icons, messages, and the like, that is, displays as a graphical user interface (GUI) on the basis of the instruction from the CPU 71.

In some cases, the storage unit 79 including a hard disk, a solid-state memory, or the like, and a communication unit 80 including a modem or the like are connected to the input/output interface 75.

The communication unit 80 performs communication processing via a transmission path such as the Internet, wired/wireless communication with various types of devices, bus communication, and the like.

A drive 81 is also connected to the input/output interface 75 as necessary, and a removable storage medium 82 such as a magnetic disk, an optical disk, a magneto-optical disk, or a semiconductor memory is appropriately mounted.

A data file such as a program used for each processing can be read from the removable storage medium 82 by the drive 81. The read data file is stored in the storage unit 79, and images and voice included in the data file are output by the display unit 77 and the voice output unit 78. Furthermore, a computer program and the like read from the removable storage medium 82 are installed in the storage unit 79 as necessary.

In this computer device, for example, software for processing of the present embodiment can be installed via network communication by the communication unit 80 or the removable storage medium 82. Alternatively, the software may be stored in advance in the ROM 72, the storage unit 79, or the like.

The CPU 71 executes information processing and communication processing necessary for the information processing apparatus 1 including the above-described arithmetic processing unit by executing the processing operations on the basis of the various programs.

Note that the information processing apparatus 1 is not limited to a single computer device as illustrated in FIG. 2 and may be configured by systematizing a plurality of computer devices. The plurality of computer devices may be systematized by a local area network (LAN) or the like, or may be arranged in a remote place by a virtual private network (VPN) or the like using the Internet or the like. The plurality of computer devices may include a computer apparatus as a server group (cloud) which can be used by a cloud computing service.

6. Summary

As described in each of the examples described above, the information processing apparatus 1 includes the specification unit 10 which specifies the auxiliary information SD for generating the digest video DV on the basis of the scene-related information about the scene occurring in the event such as a sports game.

The event is, for example, a gathering such as a sports game or a concert. Furthermore, the auxiliary information SD is, for example, information used to generate the digest video DV, and is information used to determine which portion of the video is cut out from a captured video. For example, in the case of a sports game, specifically, information such as a player name, a scene type, and a play type is used as the auxiliary information.

Since the time zone to be cut out from the captured video can be specified by specifying the auxiliary information SD, the digest video DV can be generated.

The scene-related information may be information including metadata distributed from another information processing apparatus (metadata server 200).

The metadata is information including the progress status of a gathering such as a sport, and includes, when taking a sports game as an example, time information of occurrence of a specific play, a player name related to the play, information of a score changed as a result of the play, and the like.

By specifying the auxiliary information SD on the basis of such metadata, it is possible to more appropriately specify the time zone to be cut out from the captured video.

The scene-related information may include information relating to posting by a user of a social networking service (SNS).

In the SNS, various posts are made in accordance with the progress status of the gathering. Then, by analyzing the content posted to the SNS, it is possible to specify a scene of high interest/concern of the viewer.

By specifying the auxiliary information SD on the basis of the scene-related information which is information obtained from such an SNS, it is possible to generate the digest video DV including an appropriate scene suitable for the interest/concern of the viewer.

Note that, as described above, the information regarding the post by the user of the SNS is information relating to the information posted on the SNS, and includes, for example, a keyword or the like having a high appearance frequency in the latest predetermined time. As this information, a keyword may be extracted on the basis of information posted on the SNS, a keyword presented by a service attached to the SNS may be acquired, or a keyword presented by a service different from the SNS may be acquired.

The auxiliary information SD may be information indicating whether or not to perform adoption as the broadcast video VA.

For example, if the section adopted as the broadcast video VA can be specified in the captured video, the section not adopted as the broadcast video VA can be specified.

Therefore, the digest video DV can be generated to include the clip video CV which is not adopted as the broadcast video VA. Therefore, it is possible to provide the digest video DV including a new video for the viewer.

The auxiliary information SD may be keyword information.

The keyword information is, for example, information such as player name information, scene type information, play type common use, and a tool name.

By using the keyword information, the processing of specifying the time zone to be cut out from the captured video can be realized with a small processing load.

The keyword information may be scene type information.

For example, the clip video CV to be cut out from the captured video is determined on the basis of the scene type information.

Therefore, the digest video DV including the clip video CV corresponding to a predetermined scene type can be generated.

The keyword information may be information for specifying a participant of the event.

In a case where the event is a sports game, a scene to be cut out from the captured video is determined on the basis of the keyword information such as a player name or a uniform number of a player who has participated in the game.

Therefore, the digest video DV or the like focusing on a specific player can be generated.

The auxiliary information SD may be information used for generating the clip collection CS including one or more clip videos CV obtained from the plurality of imaging devices CA which captures the event.

For example, in a case where a specific play type is selected as the auxiliary information SD, a section in which the specific play type is imaged is cut out from a plurality of videos (the first video V1, the second video V2, and the like) imaged by the plurality of imaging devices CA and combined, so that the clip collection CS relating to the play type is generated.

By generating the digest video DV to include the clip collection CS generated in this manner, it is possible to view one play from different angles, and it is possible to generate the digest video DV in which the viewer can more easily grasp the play status.

The clip collection CS may be obtained by combining the clip videos CV obtained by capturing a specific scene in an event, and the auxiliary information SD may include information of a predetermined combination order of the clip videos CV.

The clip collection CS is obtained by combining a plurality of clip videos CV as partial videos obtained by imaging one play from different angles.

In such a generation of the clip collection CS, by connecting the videos in a predetermined order, it is possible to provide the viewer with a video in which one play can be viewed from different angles, and it is possible to reduce a processing load for determining the combination order.

The information of the combination order of the clip video CV may be information corresponding to a scene type for a specific scene.

That is, the predetermined order may be an appropriate order different for every type of scene.

For example, in a case where one clip collection CS is generated for one field goal occurring in the American football game, an appropriate clip collection CS for the field goal can be generated by combining the clip videos CV in a specific order in order for the viewer to correctly recognize a status regarding the field goal or to enhance the realistic feeling. The template having a specific order is defined to combine, in a predetermined order, videos captured from different angles, such as a video from the side, a video from the back side of the goal, a video from the front side of the goal, and a bird's eye view. The appropriate clip collection CS can be automatically generated by applying the video of each imaging device CA in accordance with the template.

Then, the processing load for determining the video combination order can be reduced.

Furthermore, the template may be different depending on the scene type.

The information processing apparatus 1 may include the clip collection generation unit 11 which generates the clip collection CS by using the auxiliary information SD.

Therefore, a series of processing from the specification of the auxiliary information SD to the generation of the clip video CV and the generation of the clip collection CS is executed in the information processing apparatus 1.

In a case where the information processing apparatus 1 is a single apparatus, it is not necessary to transmit information necessary from the specification of the auxiliary information SD to the generation of the clip collection CS to another information processing apparatus, so that the processing load can be reduced.

Note that a short different video, image, or the like may be interposed between the clip video CV and the clip video CV.

The clip collection generation unit 11 of the information processing apparatus 1 may generate the clip collection CS by combining the clip videos CV.

For example, the clip collection CS is generated only by combining the clip videos CV without interposing another video.

Therefore, it is possible to reduce the processing load required for generating the clip collection CS.

The clip collection CS may be obtained by combining the clip videos CV obtained by imaging a specific scene in an event.

By combining a plurality of clip videos CV obtained by cutting videos captured from different angles for a certain scene, the clip collection CS capable of confirming the scene from different angles is generated.

Therefore, it is possible to generate the digest video DV in which the user can easily grasp the event occurring in each scene.

The clip collection generation unit 11 of the information processing apparatus 1 may generate the clip collection CS by using the analysis result obtained by the image analysis processing on the video obtained from the imaging device CA which captures an event and the auxiliary information SD.

It is possible to specify information regarding a subject of the video, scene type information, and the like by the image analysis processing on the video.

Therefore, the clip collection CS corresponding to the auxiliary information SD can be generated, and the appropriate digest video DV can be generated.

The image analysis processing may be processing of specifying a person appearing in the video.

By appropriately specifying the person appearing in the video by the image analysis processing, it is possible to specify the clip video CV to be included in the clip collection CS based on the keyword such as a player name.

Therefore, the processing load according to the selection of the clip video CV can be reduced.

The image analysis processing may be processing of specifying the type of a scene appearing in a video.

By appropriately specifying the type of the scene appearing in the video by the image analysis processing, it is possible to specify the clip video CV to be included in the clip collection CS based on the keyword such as a scene type.

Therefore, the processing load according to the selection of the clip video CV can be reduced.

The image analysis processing may be processing of specifying an in-point and an out-point.

By specifying the in-point and the out-point by the image analysis processing, it is possible to cut, as the clip video CV, a video in an appropriate section.

Therefore, it is possible to appropriately generate the clip collection CS and generate the digest video DV.

The image analysis processing may include processing of assigning a score to every clip video CV.

Depending on the time length of the clip video CV, it may not be possible to include all the clip videos CV obtained by imaging the scene in one clip collection CS. Furthermore, there are the clip video CV or the like which is not desirably included in the clip collection CS.

By scoring for every clip video CV, it is possible to generate the clip collection CS obtained by combining only appropriate clip videos CV.

In the information processing method according to the present embodiment, a computer device executes processing of specifying auxiliary information for generating a digest video on the basis of scene-related information regarding a scene occurring in an event.

The program to be executed by the information processing apparatus 1 described above can be recorded in advance in a hard disk drive (HDD) as a recording medium built in a device such as a computer device, a ROM in a microcomputer having a CPU, or the like. Alternatively, the program can be temporarily or permanently stored (recorded) in a removable recording medium such as a flexible disk, a compact disc read only memory (CD-ROM), a magneto optical (MO) disk, a digital versatile disc (DVD), a Blu-ray disc (registered trademark), a magnetic disk, a semiconductor memory, or a memory card. Such a removable recording medium can be provided as so-called package software.

Furthermore, such a program can be installed from the removable recording medium into a personal computer or the like, or can be downloaded from a download site via a network such as a local area network (LAN) or the Internet.

Note that the effects described in the present specification are merely examples and are not limited, and other effects may be provided.

Furthermore, the above-described examples may be combined in any way, and the above-described various functions and effects may be obtained even in a case where various combinations are used.

7. Present Technology

The present technology can also adopt the following configurations.

(1)

An information processing apparatus including:
a specification unit that specifies auxiliary information for generating a digest video on the basis of scene-related information regarding a scene occurring in an event.

(2)

The information processing apparatus according to (1), in which the scene-related information is information including metadata distributed from another information processing apparatus.

(3)

The information processing apparatus according to (1) or (2), in which the scene-related information includes information relating to a post by a user of the social networking service.

(4)

The information processing apparatus according to any one of (1) to (3), in which the auxiliary information is information indicating whether or not to perform adoption as a broadcast video.

(5)

The information processing apparatus according to any one of (1) to (4), in which the auxiliary information is keyword information.

(6)

The information processing apparatus according to (5), in which the keyword information is scene type information.

(7)

The information processing apparatus according to (5), in which the keyword information is information for specifying a participant of the event.

(8)

The information processing apparatus according to any one of (1) to (7), in which the auxiliary information is information used for generating a clip collection including one or more clip videos obtained from a plurality of imaging devices that captures the event.

(9)

The information processing apparatus according to (8), in which
the clip collection is a combination of clip videos obtained by imaging a specific scene in the event, and
the auxiliary information includes information of a predetermined combination order of the clip videos.

(10)

The information processing apparatus according to (9), in which information of the combination order is information corresponding to a scene type of the specific scene.

(11)

The information processing apparatus according to any one of (8) to (10), further including:
a clip collection generation unit that generates the clip collection by using the auxiliary information.

(12)

The information processing apparatus according to (11), in which the clip collection generation unit generates the clip collection by combining the clip videos.

(13)

The information processing apparatus according to (12), in which the clip collection is obtained by combining clip videos obtained by imaging a specific scene in the event.

(14)

The information processing apparatus according to any one of (11) to (13), in which the clip collection generation unit generates the clip collection by using an analysis result, which is obtained by image analysis processing on a video obtained from an imaging device that images the event, and the auxiliary information.

(15)

The information processing apparatus according to (14), in which the image analysis processing is processing of specifying a person appearing in a video.

(16)

The information processing apparatus according to (14), in which the image analysis processing is processing of specifying a type of a scene appearing in a video.

(17)

The information processing apparatus according to (14), in which the image analysis processing is processing of specifying an in-point and an out-point.

(18)

The information processing apparatus according to (14), in which the image analysis processing includes processing of assigning a score to each of the clip videos.

(19)

An information processing method, which is executed by a computer device, including:
 processing for specifying auxiliary information for generating a digest video on the basis of scene-related information regarding a scene occurring in an event.

(20)

A program for causing an arithmetic processing apparatus to execute a function of processing for specifying auxiliary information for generating a digest video on the basis of scene-related information regarding a scene occurring in an event.

REFERENCE SIGNS LIST

1 Information processing apparatus
10 Specification unit
11 Clip collection generation unit
200 Metadata server (another information processing apparatus)
CA Imaging device
DV Digest video
SD Auxiliary information
CV Clip video
CS Clip collection
VA Broadcast video

The invention claimed is:

1. An information processing apparatus comprising:
 circuitry configured to
  specify auxiliary information for generating a digest video based on scene-related information regarding a scene occurring in an event, and
  generate a clip collection including one or more clip videos by using the specified auxiliary information,
 wherein the clip collection is generated according to a likelihood that a subject indicated by the specified auxiliary information is imaged in each of the one or more clip videos included in the clip collection, and
 wherein the auxiliary information includes information indicating whether or not to perform adoption as a broadcast video.

2. The information processing apparatus according to claim 1,
 wherein the scene-related information includes information including metadata distributed from another information processing apparatus.

3. The information processing apparatus according to claim 1,
 wherein the scene-related information includes information relating to a post by a user of the social networking service.

4. The information processing apparatus according to claim 1,
 wherein the auxiliary information includes keyword information.

5. The information processing apparatus according to claim 4,
 wherein the keyword information includes scene type information.

6. The information processing apparatus according to claim 4,
 wherein the keyword information includes information for specifying a participant of the event.

7. The information processing apparatus according to claim 1,
 wherein the one or more clip videos are obtained from a plurality of imaging devices that capture the event.

8. The information processing apparatus according to claim 7,
 wherein the clip collection is a combination of clip videos obtained by imaging a specific scene in the event, and
 wherein the auxiliary information includes information of a predetermined combination order of the clip videos.

9. The information processing apparatus according to claim 8,
 wherein the information of the predetermined combination order includes information corresponding to a scene type of the specific scene.

10. The information processing apparatus according to claim 7,
 wherein the circuitry generates the clip collection by combining the clip videos from the plurality of imaging devices.

11. The information processing apparatus according to claim 10,
 wherein the clip collection is obtained by combining clip videos obtained by imaging a specific scene in the event.

12. The information processing apparatus according to claim 7,
 wherein the circuitry generates the clip collection by further using an analysis result, which is obtained by image analysis processing on a video obtained from at least one imaging device among the plurality of imaging devices that images the event.

13. The information processing apparatus according to claim 12,
 wherein the image analysis processing includes processing of specifying a person appearing in the video.

14. The information processing apparatus according to claim 12,
 wherein the image analysis processing includes processing of specifying a type of a scene appearing in the video.

15. The information processing apparatus according to claim 12,
 wherein the image analysis processing includes processing of specifying an in-point and an out-point.

16. The information processing apparatus according to claim 12,
 wherein the image analysis processing includes processing of assigning a score to each of the one or more clip videos.

17. An information processing method, which is executed by a computer device, the method comprising:
 specifying auxiliary information for generating a digest video based on scene-related information regarding a scene occurring in an event; and
 generating a clip collection including one or more clip videos by using the auxiliary information,
 wherein the clip collection is generated according to a likelihood that a subject indicated by the specified auxiliary information is imaged in each of the one or more clip videos included in the clip collection, and
 wherein the auxiliary information includes information indicating whether or not to perform adoption as a broadcast video.

18. A non-transitory computer-readable storage medium having embodied thereon a program, which when executed by a computer causes the computer to execute a method, the method comprising:
- specifying auxiliary information for generating a digest video based on scene-related information regarding a scene occurring in an event; and
- generating a clip collection including one or more clip videos by using the auxiliary information,
- wherein the clip collection is generated according to a likelihood that a subject indicated by the specified auxiliary information is imaged in each of the one or more clip videos included in the clip collection, and
- wherein the auxiliary information includes information indicating whether or not to perform adoption as a broadcast video.

* * * * *